United States Patent
Taylor et al.

(10) Patent No.: US 12,353,590 B2
(45) Date of Patent: Jul. 8, 2025

(54) SECURE DATA PROCESSING

(71) Applicant: Via Science, Inc., Somerville, MA (US)

(72) Inventors: Jeremy Taylor, Montreal (CA); John Christopher Muddle, Barcelona (ES); Jesús Alejandro Cárdenes Cabré, Montreal (CA); Ashley DaSilva, Montreal (CA); Madjid Aoudia, Montreal (CA)

(73) Assignee: Via Science, Inc., Somerville, MA (US)

( * ) Notice: Subject to any disclaimer, the term of this patent is extended or adjusted under 35 U.S.C. 154(b) by 754 days.

(21) Appl. No.: 17/562,650

(22) Filed: Dec. 27, 2021

(65) Prior Publication Data
US 2022/0207176 A1 Jun. 30, 2022

Related U.S. Application Data

(60) Provisional application No. 63/131,621, filed on Dec. 29, 2020.

(51) Int. Cl.
*G06F 21/62* (2013.01)
*H04L 9/08* (2006.01)

(52) U.S. Cl.
CPC ...... *G06F 21/6245* (2013.01); *G06F 21/6227* (2013.01); *H04L 9/085* (2013.01); *G06F 2221/2101* (2013.01)

(58) Field of Classification Search
CPC ............ G06F 21/6245; G06F 21/6227; G06F 2221/2101; H04L 9/085
See application file for complete search history.

(56) References Cited

U.S. PATENT DOCUMENTS

| 11,347,885 B2 * | 5/2022 | Muddle | H04L 9/3239 |
| 11,784,836 B2 * | 10/2023 | Muddle | H04L 9/50 |

OTHER PUBLICATIONS

International Preliminary Report on Patentability issued on Jul. 4, 2023 for International Patent Application No. PCT/US2021/065226 filed Dec. 27, 2021, 10 pages.
International Search Report and Written Opinion mailed on Apr. 7, 2022 and issued in International Patent Application No. PCT/US2021/065226, filed Dec. 27, 2021, 16 pages, 12 pages.
(Continued)

*Primary Examiner* — Han Yang
(74) *Attorney, Agent, or Firm* — Pierce Atwood LLP

(57) ABSTRACT

A computing system that facilitates execution of protocol for requesting data from one or more data owners. The protocol may specify an execution graph for performing operations collect the requested data. The execution graph may be comprised of execution graph nodes specifying operations such as accessing a database, querying the database, and scrubbing the resulting data of sensitive information. An execution graph may be agreed upon and stored on a blockchain. Storing the execution graph on the blockchain ensures a validated consensus among parties, such as the data owners, for the operations defined within the execution graph. The protocol may include requests for data from multiple data owners. The data received from each data owner may be aggregated. Rules may require the aggregated data meet certain requirements before release such as removing sensitive information or a minimum number of data records to prevent exposure of private data.

20 Claims, 16 Drawing Sheets

(56) References Cited

OTHER PUBLICATIONS

Ziye Geng, et al., "Poster: Smart-Contract Based Incentive Mechanism for K-Anonymity Privacy Protection in LBSs," 2017 IEEE Symposium on Privacy-Aware Computing, in IEEE Computer Society, (2017), pp. 200-201.

Mochan Fan, et al., "Consortium Blockchain Based Data Aggregation and Regulation Mechanism for Smart Grid," in IEEE Access, (2019), 13 pages, 12 pages.

Siguang Chen, et al., "Double-Blockchain Assisted Secure and Anonymous Data Aggregation for Fog-Enabled Smart Grid," Engineering [Online], vol. 8, (2022), pp. 159-169, retrieved from https://www.sciencedirect.com/science/article/pii/S2095809920302071.

\* cited by examiner

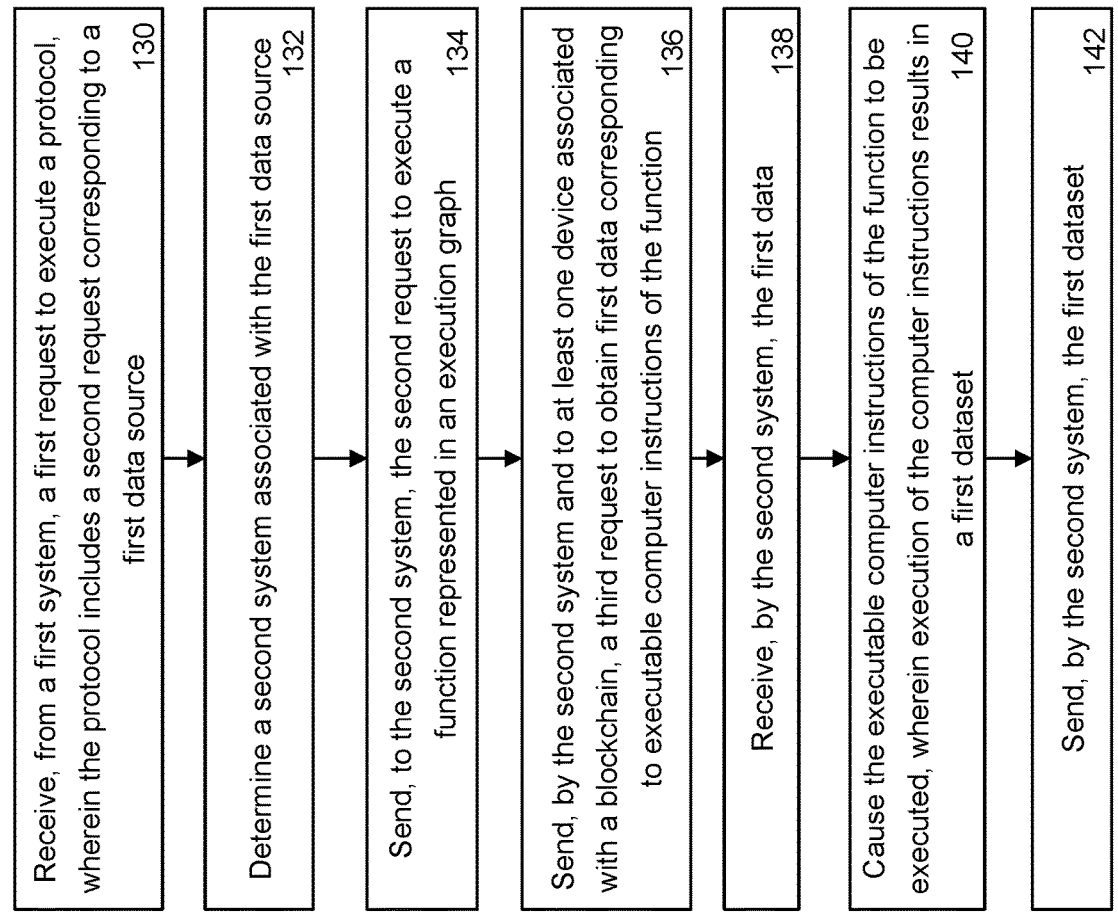
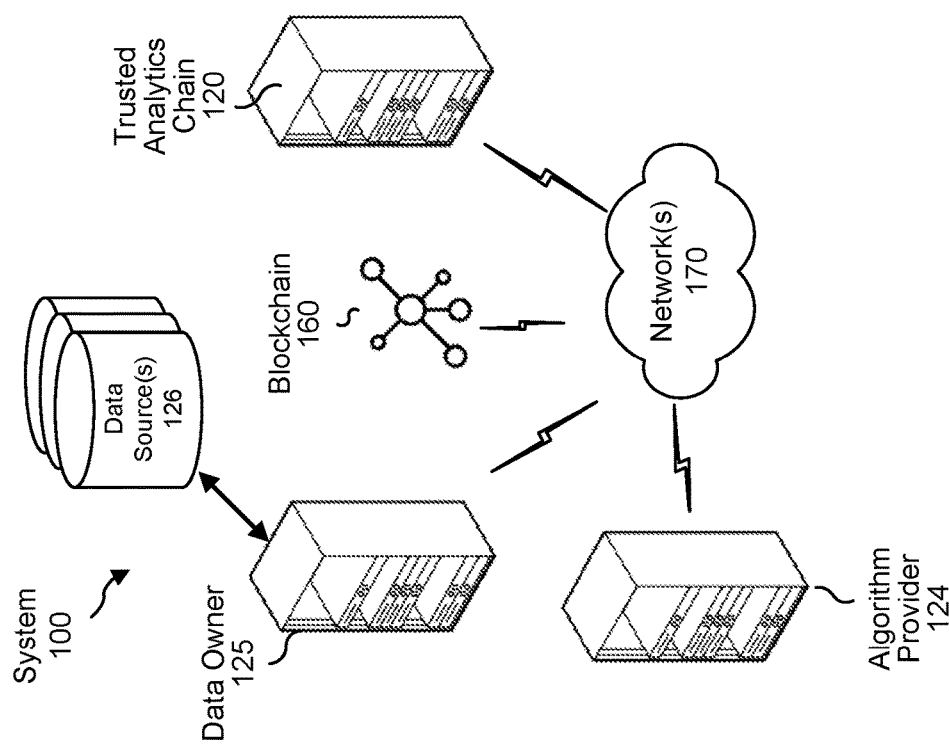
FIG. 1

Function matching specification:
exact_match(function_in_environment(scrub_pii))
Modification function specification:
function_in_environment(convert_data_to_pii_scrubbed)

Function matching specification:
exact_match(function_in_environment(inject_secret))
Modification function specification:
function_in_environment(create_privacy_risk_for_secret)

Function matching specification:
exact_match(function_in_environment(load_db_cursor))
Modification function specification:
function_in_environment(convert_pwd_to_db_cursor)

Function matching specification:
exact_match(function_in_environment(load_data_from_db))
Modification function specification:
function_in_environment(convert_db_cursor_to_data_extract)

FIG. 5

Actors:
- Alpha Energy:
  - Alpha's Protocol matching specification 1
  - Alpha's Protocol matching specification 2
- Beta Energy:
  - Beta's Protocol matching specification 1
  - Beta's Protocol matching specification 2
- Aggregator:
  - Aggregator's Protocol matching specification 1
  - Aggregator's Protocol matching specification 2
- Receiver:
  - Receiver's Protocol matching specification 1
  - Receiver's Protocol matching specification 2

Initiating messages:
- To: Alpha Energy, Message: Initiate execution(load_db_graph)
- To: Beta Energy, Message: Initiate execution(load_db_graph)

FIG. 9

SECURE DATA PROCESSING

CROSS-REFERENCE TO RELATED APPLICATION DATA

This application claims the benefit of and priority to U.S. Provisional Patent Application No. 63/131,621, filed Dec. 29, 2020, and entitled "Secure Data Processing," in the name of Jeremy Taylor, et al. The above provisional application is herein incorporated by reference in its entirety.

BACKGROUND

Data security and encryption is a branch of computer science that relates to protecting information from disclosure to other systems and allowing only an intended system access to that information. The data may be encrypted using various techniques, such as public/private key cryptography and/or elliptic cryptography, and may be decrypted by the intended recipient using a shared public key and a private key and/or other corresponding decryption technique. Transmission of the data is protected from being decrypted by other systems at least by their lack of possession of the encryption information.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 1 illustrates a system for secure data processing, in accordance with some embodiments of the present disclosure.

FIG. 5 illustrates an example of an execution graph registry, in accordance with some embodiments.

FIG. 9 illustrates an example of a protocol specification, in accordance with some embodiments.

SUMMARY

Figure 2:
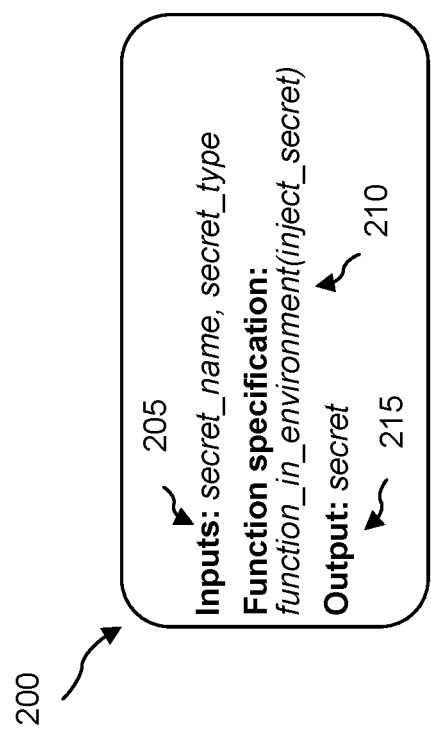
FIG. 2 illustrates an example execution graph node, in accordance with some embodiments.

A system and method for requesting a data resulting from the execution of computer executable instructions corresponding to an agreement between parties. A first request is received from a first system to execute a protocol. The protocol includes a second request corresponding to a first data source. A second system is determined based on an association with the first data source. A second request is sent to the second system to execute a function represented in an execution graph. A third request is sent to at least one device associated with a block chain by the second system. The third request requests to obtain first data corresponding to executable computer instructions of the function, wherein the first data corresponds to an agreement between at least a first party and a second party regarding the function. The first data is received by the second system. The second system executes the executable computer instructions of the function, resulting in a first dataset. The second system sends the first dataset.

DETAILED DESCRIPTION

Machine-learning systems, such as those that use neural networks or other machine-learning components, may be trained using training data and then used to make predictions of events using out-of-sample (i.e., non-training) data. This data may be acquired from one or more data sources, such as a data owner (DO). A DO may have access to sensitive data that can be analyzed using machine learning components to provide insight into certain aspects of the sensitive data. The DO, for example, a power company, and may collect data regarding operational status of a data source such as a particular component (e.g., a transformer); this data may include, for example, temperature, vibration, and/or voltage data collected during use of the component. In another example, the power company may collect data regarding the usage of individual subscribers to the power company. The DO may then annotate this data to indicate times at which the component failed. Using this collected and annotated data, an algorithm provider (AP) may train a neural network to predict when the same or similar component will next fail based on the already-known times of past failure. In another embodiment, the AP may train a neural network to predict the energy demands of subscribers. Once trained, the AP may deploy the model to attempt to receive additional data collected from the component and make failure predictions for currently operating components using this out-of-sample data.

The DOs may, however, wish to keep the data, such as from individual subscribers, private and may not wish to share said data with other entities such as other DOs, etc. For example, a DO may provide data in scenarios where the data from multiple DOs is aggregated together, such that the individual aspects and source of the data may be indeterminable based on the aggregated nature of the data. A data source, or data owner, may have certain criteria for the data that is shared, how the data is used, and what actors have access to the processed data. An execution graph may be utilized to collect specific data and scrub the data of any private information. An execution graph may be defined by a set of execution graph nodes that may identify functions or processes to be performed and the resultant output. The execution graph may further define the flow of data from one execution graph node to another. The execution graph may include a set of rules governing the access to data as well as the use of the data. For example, a data owner may desire to set certain conditions on the use of its data, for example setting a number of unique identifiers that may be accessed by a data query, a maximum percentage that a single unique identifier can contribute to the underlying data (e.g., K anonymity as discussed below). As another example of data restrictions represented in the execution graph, an algorithm provider may desire to construct a deep-learning model while satisfying the restrictions imposed by the data owner. Thus, constraints upon the use of model on sensitive data may also be reflected in an execution graph.

Because of the sensitive nature of the software and/or data being used, not only is it desirable to have a system that shields different parties from sensitive information of others, it is also desirable to have a mechanism for the parties to come to an agreement on the constraints and conditions surrounding the use of the data and the execution of computer instructions to perform data queries, etc.

Utilizing multiple independent systems to provide a subset of their respective processed data may be considered a balkanization of microservices. A standard of balkanization may be applied for the independent systems that ensures their respective data privacy based on the number of independent systems combined with the size of the subset of data extracted.

A system may be configured to initiate a protocol for collection of data from one or more data owners and to deliver the data to an entity who desires to receive the data for purposes of performing operations on the data. The requestor may identify in the protocol the one or more data owners from whom data will be collected. The protocol may identify an execution graph that may be used for the collection of data from each data owner. The execution graph may be comprised of execution graph nodes (discussed below) that provide instruction for processes such as receiving a secret (e.g., a password), accessing a data storage system with sensitive data, querying the data storage system for portions of the sensitive data, and scrubbing the data (for example for removal of personally identifiable information or other sensitive information not necessary for analysis of the data). The execution graph may be previously agreed upon by potential protocol actors, such as requestors and data owners, and may be stored using a public ledger such as a blockchain, that provides a consensus of contents of the execution graph among the protocol actors.

The blockchain may store a set of rules related to collecting data from the data owners. The rules may represent a variety of conditions upon the collection and use of data. For example, the rules may be based on the type of data collected and may include requirements for the number of sources of data, such that the data may be anonymized and a data exposure risk is minimized. The rules may be based on each individual data owner and thus may differ between data owners. Before executing the protocol, the system may determine if the protocol satisfies the set of rules. The execution of the protocol may include one or more data owners executing the instructions for at least one execution graph specified in the protocol. The output for the execution graph by a data owner may be a dataset. The protocol may include an aggregator component to receive data, such as the output dataset resulting from the execution of instructions for the execution graph, from one or more data owners. An aggregator component may aggregate the received data before transmitting the data to the requestor, such that the data is further secured in an aggregated form before it is accessible by the requestor. This allows sensitive data to be accessed by a third party, such as the requestor, but securing the data in such a way that identifiable/sensitive information is removed as well as diluting the data, by including it in a collection of data from multiple data owners, such that a source for respective data portions of the data is not traceable.

Different parties that possess sensitive data may be willing to share data, as long as certain constraints and conditions are met for data that may be exposed. Particularly in a situation where the parties may have an inherent distrust, or at least wariness, it is desirable to have a process that can record when the parties come to an agreement on how data is to be used, record and maintain that agreement, include within that agreement the one or more queries that are to be performed and under what conditions, and be able to verify that any proposed execution of a data query conforms to that agreement prior to its execution.

For example, a data owner may desire to set certain conditions on the use of its data, for example setting a number of unique identifiers that may be accessed by a data query, a maximum percentage that a single unique identifier can contribute to the underlying data (e.g., K anonymity as discussed below). As another example, an algorithm provider may desire to construct a deep-learning model while satisfying the restrictions imposed by the data owner.

A protocol may be a set of instructions that identify actors and a set of matching specifications for each actor(s) that may identify the one or more processes, such as executing the instructions of an execution graph, by each protocol actor. A protocol may be executed among a known set of protocol actors with the performance of the protocol, as well as the conformation with certain rules, managed by a trusted analytics chain (TAC). The TAC is a computing system component that may be part of the network environment. The TAC may manage protocol requests, determining rule compliance, and delivery of data output. The TAC may maintain a secure computing/network environment for the secure transfer of data and compliance enforcement to prevent unwanted data exposure. For a secure multi-party computation, distributed protocols may be needed to keep the data private, thus the protocols may be specified, agreed upon by all parties, and auditable in order to maintain the security for each protocol actor.

FIG. 1 illustrates a system 100 for secure data processing, in accordance with some embodiments of the present disclosure. The illustrated system 100 may include a network 170. The network 170 may include the Internet and/or any other wide- or local-area network, and may include wired, wireless, and/or cellular network hardware. A TAC 120 may communicate, via the network 170, with one or more data owner systems 125 and algorithm provider systems 124. The TAC 120 may communicate with a blockchain 160, such as a blockchain database, which itself may include a plurality of devices. The blockchain 160 may exist as part of the TAC 120 (which may control access to the blockchain database) or the blockchain may exist as its own entity and be communicable without going through the TAC 120. A data owner system 125 may provide access to data stored in one or more data sources 126 associated with the data owner system 125.

The blockchain 160 may use blockchain technology, as one of skill in the art will understand, to maintain a public ledger of information. The blockchain 160 may be an example of a distributed consensus mechanism. As a public ledger that is a source of consensus of contents a blockchain may be considered non-refutable. A protocol actor, such as the TAC 120 or DO 125, may not communicate directly with the blockchain database of the blockchain 160; instead, it may communicate using a blockchain market and/or a blockchain agent. The blockchain database(s) may involve many different physical machines that each store all or some portion of the blockchain data. A trusted authority, as part of a blockchain 160, may be a determination of a source of a message to determine the provider/attester of a specific piece of information. Group signatures to the blockchain 160 may be used to allow members of specific groups to attest to a specific fact without revealing their identity.

As shown in FIG. 1, the TAC system 120 may be configured to receive (130), from a first system, such as the algorithm provider system 124, a first request to execute a protocol. The protocol may include a second request corresponding to a first data source, such as a data source 126 associated with a data owner system 125. The second request may be a request to the data owner system 125 to provide data from at least one data source 126. In some implementations, the TAC 120 may be configured to send, to the at least one device associated with the blockchain 160, a request to obtain data corresponding to rules based on the protocol. Further, the TAC 120 may be configured to receive the data corresponding to rules based on the protocol from the blockchain 160. The rules corresponding to the protocol may include at least one rule corresponding to a location. The rules corresponding to the protocol may include at least one rule corresponding to the data source 126 or data owner system 125.

In response to receiving the second request, the TAC 120 may be configured to determine (132) a second system, such as the data owner system 125 associated with the first data source. The TAC 120 may be further configured to send (134), to the second system, the second request to execute a function represented in an execution graph. The function may be an execution graph node of the execution graph. The function may perform an operation such as a query of a database. The second system, such as the data owner system 125 may be configured to send (136), to at least one device associated with the blockchain 160, a third request to obtain first data corresponding to executable computer instructions of the function. The first data may correspond to an agreement between at least a first party and a second party, such as is a property of distributed consensus mechanism like a blockchain 160 (and as described below), regarding the function.

The second system may be configured to receive (138) the first data. The second system may be configured to cause (140) the executable computer instructions of the function to be executed. The execution of the computer instructions may result in a first dataset. For example, the data owner system 125 may perform the given function of a database query to at least one data source 126 that may result in a dataset. The second system may be configured to send (142) the first dataset to the TAC 120.

The TAC 120 may be further configured to determine a third system, such as a second data owner system, associated with the second data source. Similar to the operations of the second system, the third system may receive data for executable computer instructions of the function represented in the execution graph. Further, the third system may cause the executable computer instructions of the function to be executed, resulting in a second dataset. The third system may additionally send the second data set to the TAC 120.

The TAC 120 may be further configured to determine that a combination of records of the first dataset and the second dataset exceeds a predetermined threshold for the number of records that may be required for release of the datasets, as indicated by at least one of the rules based on the protocol. The TAC 120 may be further configured to determine an aggregate of the first dataset and the second dataset. In response to determining the aggregate, the TAC 120 may be configured to send, to the first system, the aggregate. Further details of the system are described below.

In the present disclosure, a reference to an entity such as a DO, an AP, a protocol actor, etc. may refer to a computing system, server, virtual machine, computing device, or component associated with that entity, and not necessarily a person or group of that entity.

As there may be a number of privacy concerns surrounding the use and exchange of models, data, etc. to be used with these systems, there are also privacy and trust concerns surrounding the process for agreeing on what operations may be performed with what data. Specifically, in certain situations it may be desirable for parties to be able to exchange executable terms of an execution graph in a manner that both offers some privacy protections but also allows the parties to come to a verified, agreed-upon structure under which to operate the executable instructions of the execution graph to perform operations using certain data, models, etc. For example, the parties may wish to enter into an agreement to allow certain data to be processed under certain conditions. This may occur, for example, with a data owner (DO) that has particularly private data (for example medical information, energy usage information, etc.) and wishes to allow certain entities to use or access that data but only under certain strict (but perhaps flexible in certain ways) conditions. Such data usage may include any number of operations, but examples may include energy usage in a particular area, number of patients that have a used a medical provider or received certain treatment during a certain time frame, etc. The conditions under which data may be used may actually rely on underlying data that the parties wish to remain private and protected. (For example, only permitting an energy use query if a certain number of households were actually using energy during a particular time window.) Further, the precise executable code/algorithm executed as part of the data usage may be consider private to an algorithm provider (AP) and so such algorithms are to be protected from view by other parties. Further, the parties may wish to know that the underlying instructions of the execution graph will perform the desired function without undue edits or variations to the specific code after an agreement on the code/conditions have been reached.

The present disclosure offers components and techniques to address these issues and offer parties a private but mutually agreed upon and auditable system for providing data without disclosing private data to certain entities (such as the algorithm provider) and without disclosing sensitive algorithm code to certain entities (such as a data owner). In particular, the present disclosure offers a mutually agreed upon and immutable execution graph for securely collecting and scrubbing data. Parties to a non-refutable execution graph may review the contents, or execution graph nodes, to determine that the computer instructions to be executed are exactly as intended by the reviewing party, with particular variables, flow of data, and output.

A data owner and algorithm provider may be parties to a protocol for data collection and output, such as for use in developing a model. The data owner may be an entity that has access to a set of data that it wishes to keep private. For example medical data, energy data, consumer data, etc. The data owner may desire to restrict an algorithm provider to only to be able to access the data in a particular manner and under particular conditions. The data owner may wish to indicate to the algorithm provider certain conditions for accessing the data in a manner that the data owner understands will be adhered to. An algorithm provider may desire to know that a proposed data operation (sometimes referred to as a data query though the operation may be more general than that) will obtain desired information when the computer executable instructions of the data operation (i.e., portions of the execution graph) are run, as well as knowing that the conditions proposed by the data owner will be satisfied.

As an example, a data owner in the energy field may keep a data storage related to the performance of certain components such as transformers or individual power meters. It may wish to allow a data analyst access to the data for purposes of assessing the health and operability of a transformer with some initial constraints but also some variable constraints depending on the circumstances. The data owner and analyst may use the executable graph approach to propose and edit the operations to be performed on the data as well as to verify that the proposals match and will allow the parties to control/access the data as desired (e.g., the constraints are sufficient for the data owner) to achieve the intended result (e.g., the data to be accessed is sufficient for the analyst). Once approved, the execution graph may then be stored in a mutually accessible manner (for example, as part of a blockchain) for retrieval upon execution.

As part of the execution graph, certain data may be provided to a requestor, such as an algorithm provider, as part of the output of the execution graph while other data, such as personally identifiable information, may be obfuscated from the requestor. Personally identifiable information is an example of sensitive information that may be protected and hidden in some manner using the disclosed techniques. Such sensitive information may include, but is not limited to information such as a name, address, phone number, social security number, credit card information, email address, etc. While personally identifiable information is provided as an example of data that may be scrubbed, many types of data may be considered sensitive and thus may be removed from the resultant data, such as device identifiers, bank account information, power meter locations, transaction identifiers, job titles, etc. This may be accomplished using agreed upon filters specified in the execution graph. For example, energy information of a particular energy meter may be provided but the identifier and underlying user of that energy meter may not be provided. Further, conditions may be applied such as only providing to the analyst energy data for a particular zip code as long as there are X energy meters in the zip code and no one energy meter can contribute more than N percentage of the overall energy usage. This condition may be referred to as K anonymity, thus conditioning access to data on conditions that the data will not reveal too much information about a particular user. Such conditions may be checked and confirmed prior to execution of the protocol through the governance and actor rules.

Once agreed upon by the parties, the execution graph may become fixed thus preventing any altering of its nodes and functions by either of the parties. Portions of an execution graph may be authored by any party. Another party may then review/suggest changes to the constructed execution graph until an agreed-upon set of execution graph nodes and flow of the execution graph is reached. Once agreed-upon, the parties may store the execution graph using the blockchain, which may allow all parties to sign and agree to its contents while being secure that the contents of the execution graph have not been altered. The system may determine one or more hashes (as explained herein) of the execution graph to ensure that a version of the execution graph accessed by a party matches a version stored on the blockchain. Thus, the parties can verify that the code and nodes included in an execution graph is correct without making the code or nodes of the execution graph available for others to see. A party to the execution graph may also provide access to the execution graph to one or more third parties, such as a privacy officer of a company (or the like), for example to perform checks such as whether the offered code in the execution graph conforms to some standard such as a data security standard. The third party may access the execution graph and/or its hash or other information from one of the original parties and/or from the blockchain.

FIG. 2 illustrates an example execution graph node 200, in accordance with some embodiments. The illustrated execution graph node 200 includes data representing a particular aspect of a function to be performed as part of a data analysis/query. An execution graph node 200 may include list of inputs 205 for the function, a list of outputs 215 of the function, and a function specification 210. The function specification 210 may receive inputs corresponding by name to the list of inputs 205. The function specification 210 may produce outputs corresponding by name to the list of outputs 215. FIG. 2 illustrates an example execution graph node 200 for a function specification 210 called "inject_secret" that takes a list of inputs 205 of "secret name" and "secret type" and returns a list of outputs 215 of a variable "secret." The function specification 210 of "inject_secret" may exists under the name "inject_secret" in the network environment that the function may be run. In this example, a DO may provide the value of "secret", such as a password, such that a protocol may be performed in the network environment. A network environment may be an environment where specific computer networking connectivity is accessible by the actors in the environment, such as DOs and APs.

Figure 3:
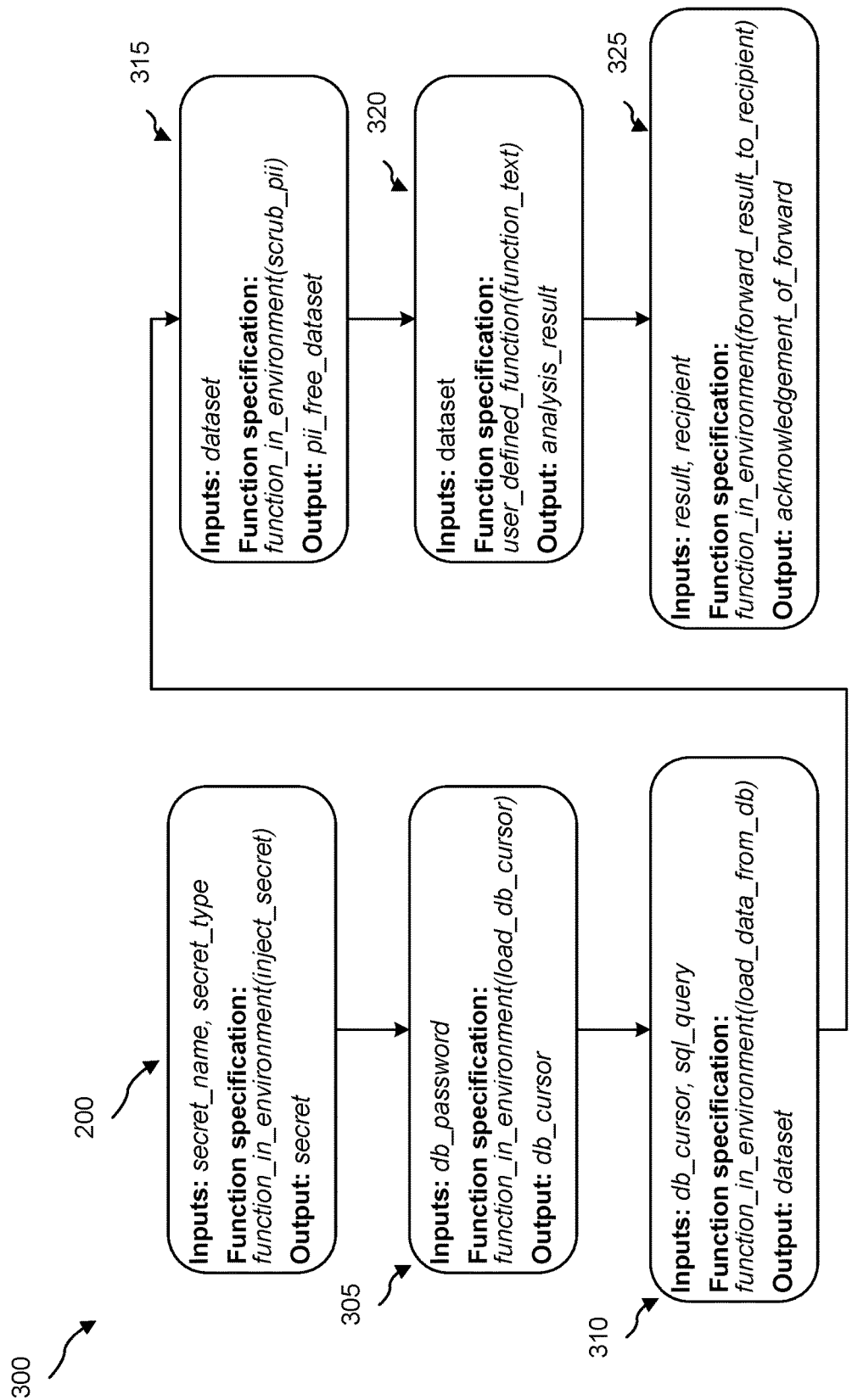
FIG. 3 illustrates an example execution graph, in accordance with some embodiments.

FIG. 3 illustrates an example execution graph 300, in accordance with some embodiments. The illustrated execution graph 300 includes data representing a particular aspect of a process, comprised of one or more execution graph nodes, to be performed as part of a data analysis/query. An execution graph 300 may include one or more execution graph nodes and a mapping of execution graph node output parameters (e.g., the list of outputs 215) to execution graph node input parameters (e.g., the list of inputs 205) of the execution graph 300. The mapping of these variables may determine how data is passed between execution graph nodes. Execution graph nodes may function like building blocks for different execution graphs. An execution graph may constructed using different configurations of execution graph nodes as well as varying number of one or more execution graph nodes.

An execution graph 300 may represent an archetypal workflow for data analysis. In an example, the computation for an execution graph 300 may begin by receiving a secret, such as a sensitive password that provides access to sensitive data. The flow of the execution graph 300, such as the example provided in FIG. 3, may proceed by traversing through the execution graph nodes of the execution graph 300 based on the mapping. For example, the flow of the example execution graph illustrated in FIG. 3 may use the sensitive password obtained from the illustrated execution graph node to create a data access object, such as a database cursor, with the "load_db_cursor" function as shown in the illustrated execution graph node 305. Continuing the example, the database cursor may then be used to determine a dataset from a subset of data resulting from a data query, such as an SQL query of a database, as shown in the illustrated execution graph node 310.

A database cursor may be used to limit what data may be accessed with the provided secret, such as a password. For example, the password may potentially grant access to a large amount of the DO's data, however, utilizing the database cursor, as shown in illustrated execution graph node 310, may limit the accessible data. Thus, the combination of providing a secret, such as a password, and a database cursor provides for granting access to otherwise inaccessible data, but also preventing access to the full scope of data that is potentially accessible with the secret. The resulting dataset from the query may be scrubbed of personally identifiable information (PII), as shown in the illustrated execution graph node 315. The overall process of producing a dataset that a DO allows to be exposed may include the execution graph using the password provided as the secret to access a database of the DO. The database cursor may be used to point to the data that is accessible to the execution graph. The resulting dataset from the query using the database cursor may then be scrubbed of PII, such that the remaining dataset includes data that may be worked with, such as by the AP, and may be exposed. For example, once the dataset is scrubbed of PII, then one or more analysis functions may be performed using the scrubbed dataset, as shown in illustrated execution graph node 320, produce a result, such as a value or resultant dataset. Finally, the result may be forwarded to one or more recipients identified in the execution graph, as shown in illustrated execution graph node 325.

A number of execution graph nodes of the execution graph 300 include a function specification 210 of a "function_in_environment", which may specify that the function specification 210 of a respective execution graph node has a known behavior and operates in the protected network environment of the TAC 120. For example, based on function specifications 210 of the previous execution graph nodes being a "function_in_environment," the "pii_free_dataset" carries with it all the privacy risk associated with the data in the database associated with the "secret name" using "sql_query," except for the PII that has been scrubbed. Execution graph node 320 includes a "user_defined_function," indicating there may not be a known behavior for the execution graph node. A "function_in_environment" may indicate a function in a known and relative grouping such as a library or package. In the present disclosure, this may indicate a function that is part of a library of functions stored on the blockchain 160. Thus, the entry of the library on the blockchain 160 may indicate a consensus among the relevant parties for the defined operations of the functions of the library.

Figure 4:
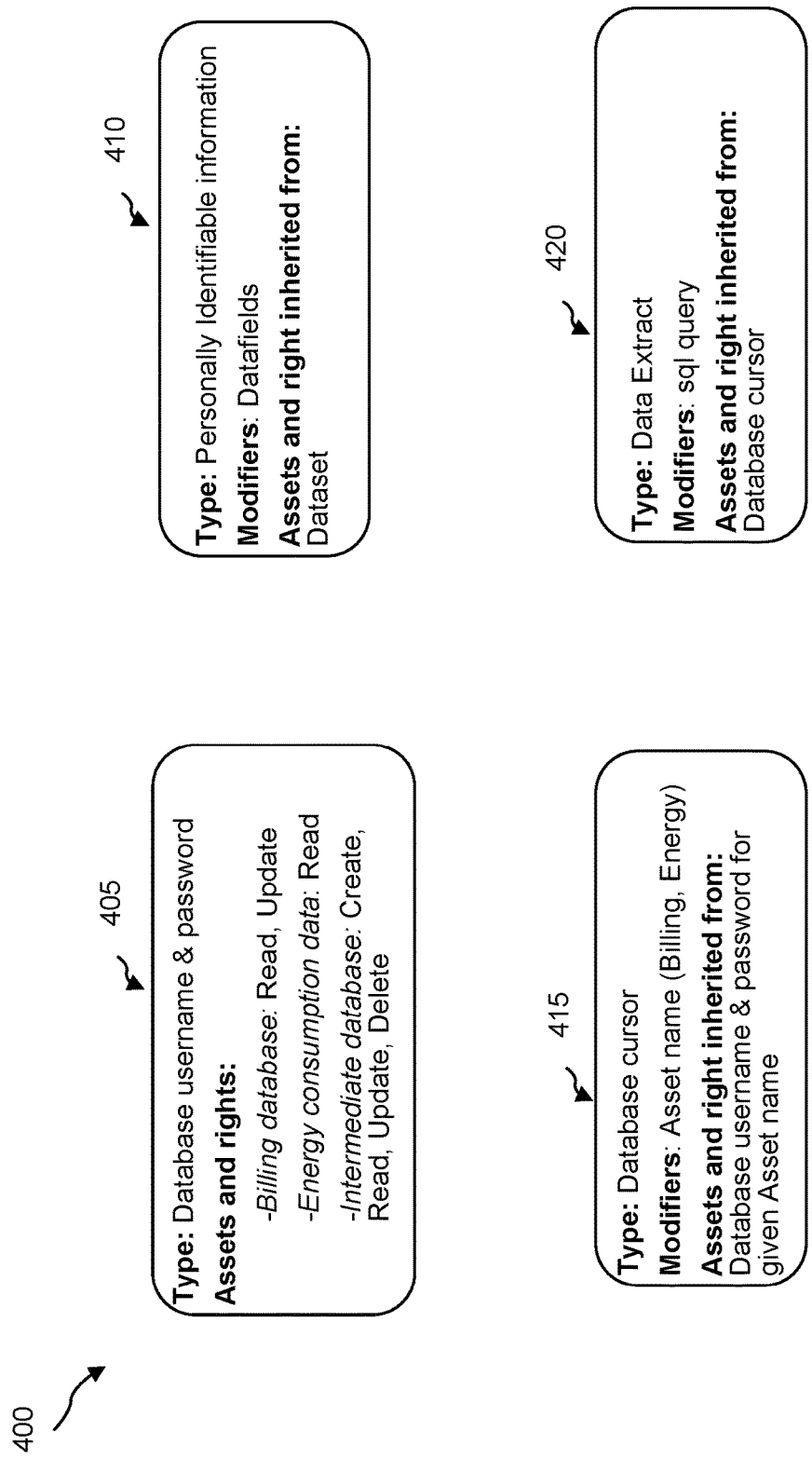
FIG. 4 illustrates an example set of execution graph metadata, in accordance with some embodiments.

FIG. 4 illustrates an example set of execution graph metadata 400, in accordance with some embodiments. An execution graph metadatum may include information about a respective variable of an execution graph node. The execution graph metadata may be stored in the blockchain with the execution graph. This information from the execution graph metadata may relate to privacy, security, equity, and inherited traits for the execution graph node and the data input and output by the execution graph node. The execution graph metadata may be accessed by the functions of the execution graph nodes to provide traits and data access rights during the execution of the functions. For example, the execution graph metadatum 410 of an example execution graph node may identify the execution graph node has access to a sensitive password or access to sensitive data granted by a sensitive password. In another example, an archetypal metadata may be a username and password and the example execution graph metadata 405 for an execution graph node may derive its properties from the username and password and may narrow the privacy risk as smaller and smaller subsets of the data are extracted. Additional examples, as found in some embodiments, of execution graph metadata may include the example execution graph metadata 415 that may provide properties for a database cursor in an execution graph, including inherited rights, such as from the example execution graph metadata 405. Similarly, as illustrated in FIG. 4, example execution graph metadata 420 inherits rights from the example execution graph metadata 415, and thus also from the example execution graph metadata 405.

FIG. 5 illustrates an example of an execution graph registry 500, in accordance with some embodiments. An execution graph registry may include information about how a given execution graph node modifies execution graph metadata associated with the inputs and outputs of the given execution graph node. An execution graph registry may apply to an execution graph or protocol and may be stored with its associated execution graph or protocol specification, such as in a blockchain. In some instances, the execution graph registry may operate on the entire execution graph rather than individual execution graph nodes of the execution graph. An execution graph registry may include definitions of specific named execution graphs.

The execution graph registry 500, as shown in FIG. 5 illustrates an example execution graph registry for portions of the example execution graph 300. For a "function_in_environment," another function may (optionally) be defined that modifies the execution graph metadata for an execution graph node to a new set of execution graph metadata output from the execution graph node and may propagate through the system. In the example execution graph 300, the execution graph nodes have a single output, but execution graph nodes may have more than one output. For example, instead of a pipeline execution graph a directed acyclic graph (DAG) execution graph may have nodes with one or more outputs. The example execution graph registry 500, identifies functions using "exact_match" based on known metadata modification properties. A "user_defined_function" may instead be identified for example, by inspecting the code for particular functions used or imported, high-entropy strings, code with security vulnerabilities (i.e., static analysis), or high cyclomatic complexity. Matching rules may be defined for entire execution graphs or entire protocols.

An execution graph registry 500 may be used to identify a type of execution graph 300. For example, identifying certain execution graph nodes as part of an execution graph 300 may indicate a type. An execution graph registry 500 may match certain execution graph nodes or patterns of execution graph nodes to identify an execution graph type, which may then provide information about the data privacy of an execution graph 300. The system may use execution graph registries to match a pattern or arraignment of execution graph nodes and based on such a match may be an indicator that the execution graph 300 includes a proper arrangement of nodes and thus the execution graph 300 may be safe to execute. The execution graph registry 500 types may then be associated with different risks, such as related to the exposure of sensitive data. For example, the data privacy risk may be higher for an execution graph registry type associated with a query of individual user data compared to a type associated with a query of aggregated data.

An execution graph registry may be a non-refutable execution graph registry if the execution graph registry is stored using a distributed consensus mechanism. A distributed consensus mechanism may be considered a non-refutable record. Blockchain is an example of a distributed consensus mechanism based on its use of a public ledger which is a source of consensus of content. An AP 124 may want to collect data, such as described above for training a model. To facilitate the collection of data, the AP 124 may create an execution graph, with the associated execution graph registry. The AP 124 may store an execution graph on a distributed consensus mechanism, such as a blockchain, so that all data contributors, such as a DO, may agree on the execution graph and understand the execution graph will not change once stored based on the non-refutable record of the distributed consensus mechanism. For example, based on the construction of the execution graph and the agreement among the DOs for a non-refutable execution graph registry stored on a distributed consensus mechanism may ensure for the DOs that the exposed data may be PII free.

A protocol may identify a set of protocol actors and each protocol actor may have an associated protocol actor specification. The protocol actor specification may indicate, such as through protocol messages, execution graphs for the protocol actor to execute.

Figure 6:
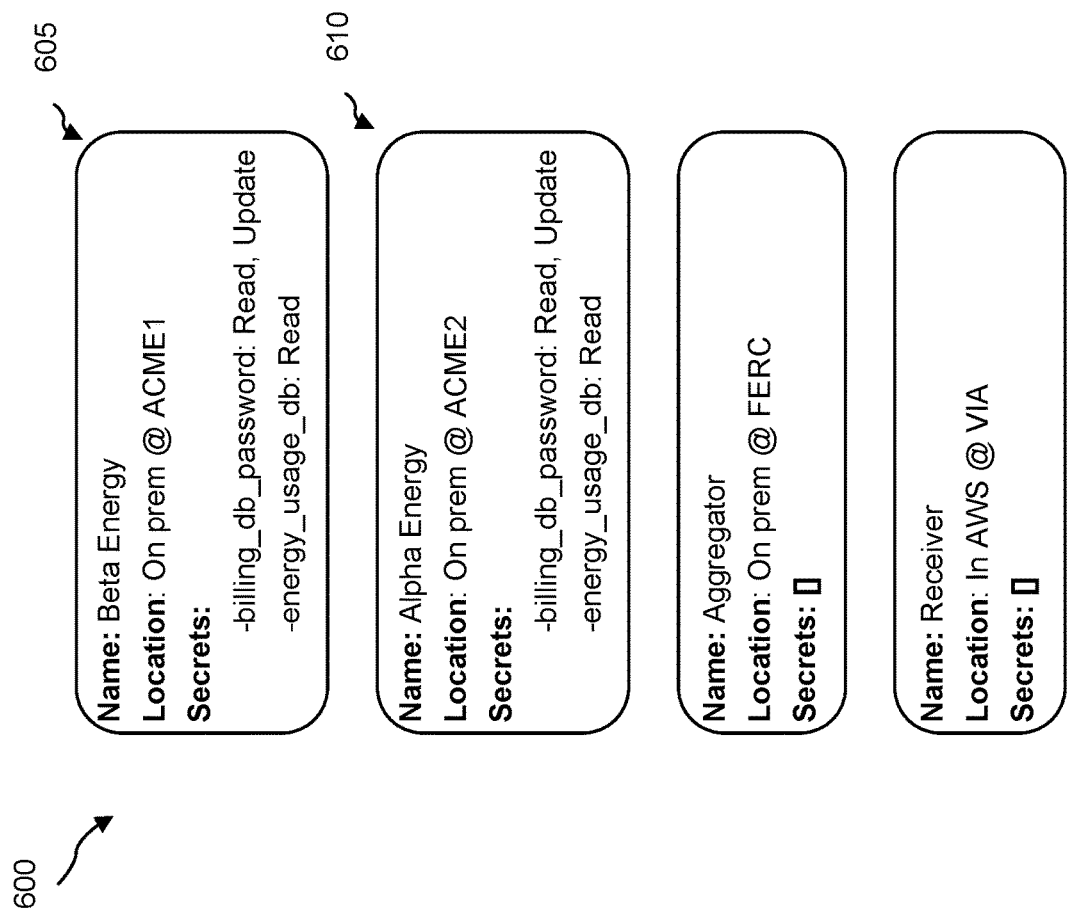
FIG. 6 illustrates an example of a protocol actor specification for a protocol actor, in accordance with some embodiments.

FIG. 6 illustrates an example of a protocol actor specification 600 for a protocol actor, in accordance with some embodiments. A protocol actor may be an entity that is identified in a protocol specification. A protocol actor may include, but is not limited to, a provider of data, such as a DO, or a receiver of data as a result of the execution of an execution graph. A protocol actor may be granted access to execution graph metadata (e.g., sensitive passwords). A protocol actor may be a part of a definite network environment in which the protocol actor may be enabled to use the sensitive passwords to access sensitive data. A protocol actor may execute the instructions of execution graphs as part of the network environment upon receiving requests from the system, such as an AP 124 or the TAC 120. As shown in FIG. 6, a protocol actor may be a DO, such as "Alpha Energy" of protocol actor specification 605 and "Beta Energy" of protocol actor specification 610. A DO protocol actor may have access to secret data, such as a password, that may grant access to data in one or more specific data storage locations. Some protocol actors may be systems or appliances designed to fulfill a role as part of the protocol. These protocol actors may not have access to data or secrets and may be started or terminated specifically for running a given protocol.

For the protocol actors to be willing to participate in the protocol, which may include submitting secret information, such as a password, and then providing access to sensitive data, the protocol actor may only agree to participate based on a known and mutually agreed upon execution graph that specifies the permitted operations to be performed using data/models, etc. Thus, the protocol actors may require a non-refutable execution graph to participate in the protocol. The non-refutable execution graph, such as an execution graph saved to a blockchain, provides the consensus and security requirements that may be required, such as part of the governance rules or actor rules, for a protocol actor to participate in a protocol.

Figure 7:
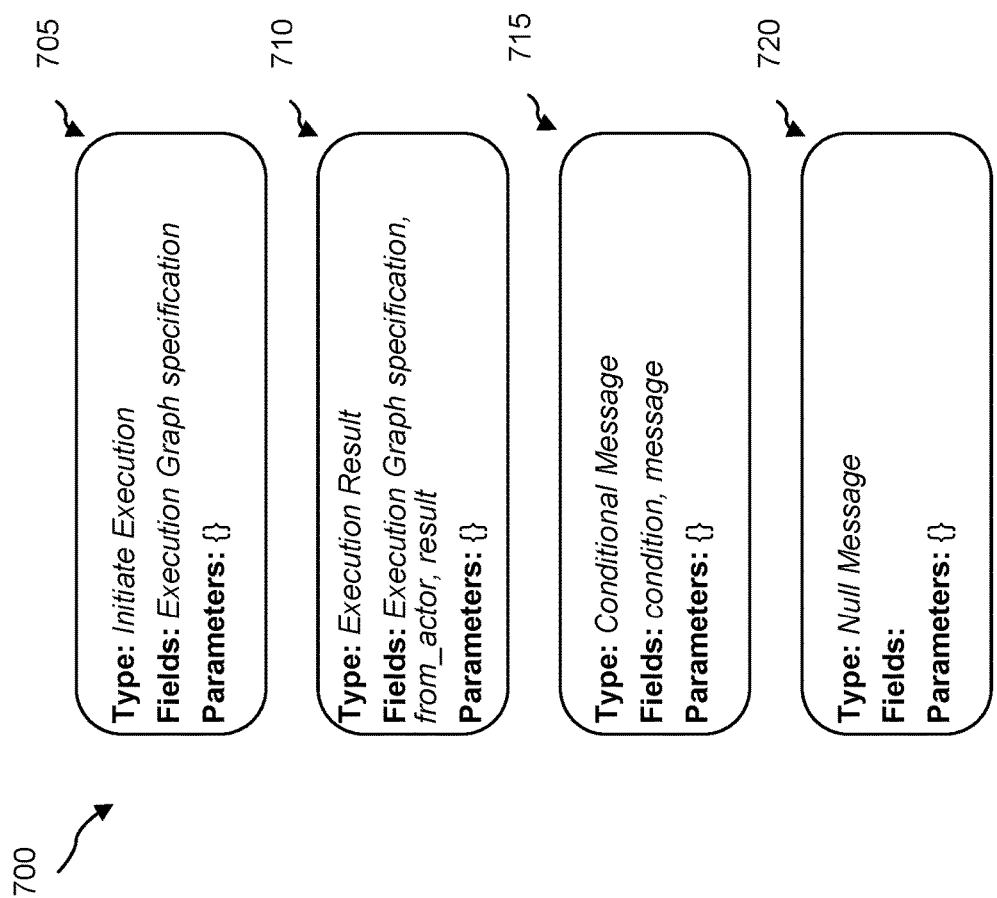
FIG. 7 illustrates an example of set of protocol messages, in accordance with some embodiments.

FIG. 7 illustrates an example of set of protocol messages 700, in accordance with some embodiments. A protocol message may be a message sent between protocol actors. The protocol messages may be used to begin executions, convey rules and conditions, and deliver data. Protocol message 705 illustrates an example of a protocol message to initiate execution of instructions for a particular execution graph. Protocol message 710 illustrates an example of a protocol message for sending the result of a particular execution graph. Protocol message 715 illustrates an example of a protocol message that may be conditionally sent to another protocol actor based on an execution graph outcome. Protocol message 720 illustrates an example of a protocol message a null message to indicate that no message was sent. Protocol messages may be defined for each protocol.

Figure 8:
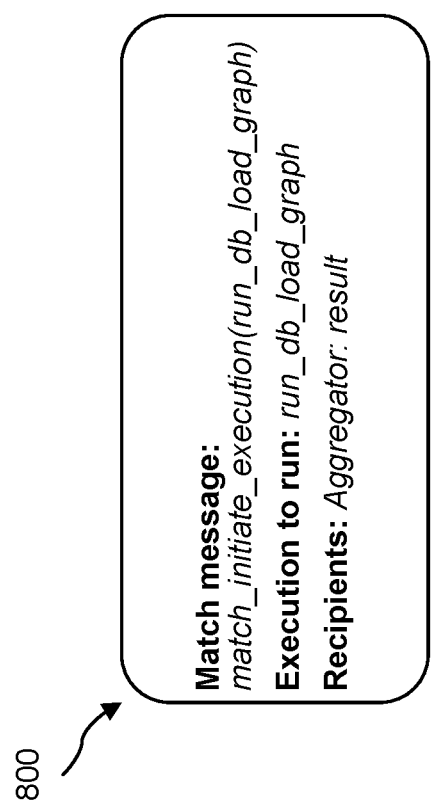
FIG. 8 illustrates an example of a protocol matching specification, in accordance with some embodiments.

FIG. 8 illustrates an example of a protocol matching specification 800, in accordance with some embodiments. A protocol matching specification may define a tuple of a rule for matching specific protocol messages to an execution graph and further define the tuple of the rule for matching a set of protocol actors to receive at least one subset of value(s) from the node variables produced from the execution of instructions for the execution graph. A protocol matching specification may be a rule that selects protocol messages requesting a protocol actor to start an execution graph and then, upon completion of the execution graph, forward the execution graph results to another protocol actor in the system.

As shown in FIG. 8, the example protocol matching specification 800 may match an initiate execution message with the execution graph, such as such as "run_db_load_graph", that may be run upon determining the match. A protocol matching specification may define recipients that may receive the result of the execution graph identified in the protocol matching specification. The example protocol matching specification 800 identifies the recipient as the "Aggregator" and indicates the recipient may receive the result of the execution graph.

A protocol actor specification may have an ordered list of protocol matching specifications that may be executed when a message is received. Should a protocol actor receive a message that does not match with any of the protocol matching specifications of the protocol actor specification's list of protocol matching specifications, then the protocol may be in error and is stopped. Using the result of an execution graph for a protocol actor, it may be possible to trace the execution graph metadata as it travels through the protocol. This may provide for computing a protocol privacy risk decomposition based on aggregating the set of execution graph metadata for each protocol message the protocol actor received during the protocol execution.

FIG. 9 illustrates an example of a protocol 900, in accordance with some embodiments. A protocol may include a list of protocol actors, where each protocol actor may have associated protocol matching specifications and initiation messages. A protocol may defined by a set of protocol actors with an associated fixed protocol actor specification and a set of protocol messages that are initiation messages designated for specific protocol actors. For a given protocol, a system may assess data privacy risk in a protocol between multiple data owners and a user of that data, such as an AP.

A protocol may be executed by determining the protocol actors identified in the protocol are monitoring for protocol messages and sending the initiation messages to the designated respective protocol actors. The protocol execution may continue by each protocol actor executing the respective protocol matching specifications in order and routing the results of the matched executions to other protocol actors identified in the protocol matching specifications. A non-refutable protocol may be determined by a protocol and interfacing with a non-refutable execution graph registry.

A protocol specification may be comprised of computer languages and mathematical models, or protocol specification languages, that determine how the protocol functions and what data is transmitted, as well as from which protocol actors send and receive such data. A protocol specification language may describe the TAC 120 functionality, such that the TAC 120 functionality instructions may be stored in a distributed consensus mechanism that provides non-repudiation for the messages transmitted by the TAC 120.

A computing system may simulate a protocol by tracing the transmission of the initiation messages to the respective destinations. The computing system may determine the protocol to be successful by determining all of the protocol messages of the protocol were recognized by at least one of the protocol matching specifications of the protocol actor who received the respective protocol message. A computing system using a protocol simulation, may determine a privacy risk decomposition for a protocol actor. In a protocol simulation, a set of protocol messages may be identified that are received by each protocol actor of the protocol. This may provide the execution graph metadata for each protocol message, which may be used by the computing system in determining the privacy risk decomposition.

A computing system may determine a protocol risk decomposition using an execution graph registry from a protocol, including a mapping between the execution graph metadata received by each protocol actor as part of the protocol. The process by the computing system for determining a protocol risk decomposition may include modifying the execution graph metadata for each execution graph that is executed by a protocol actor using the execution graph registry. The computing system may then review the execution graph registry to determine if each execution graph node of the execution graph is present in the execution graph registry. If the computing system determines a respective execution graph node is found in the execution graph registry, then the computing system may retrieve instructions from the execution graph registry corresponding to how to modify the execution graph metadata for the protocol actor. The modification instructions may include the names of functions in libraries and computing instruction code. For a transmission of a protocol message from one protocol actor to another protocol actor, the execution graph metadata corresponding to the content of the protocol message is included in the transmission. This may allow for a computing system to trace the impact and risk for accessing sensitive data with a provided sensitive password. For such a fixed network environment, this may determine the execution graph metadata risk for a protocol actor in a different network environment.

The transmission of protocol messages may be dependent, or conditioned, on the outcome result of one or more execution graphs. The execution graph registry may propagate execution graph metadata that is conditional on the data that a protocol actor may access using one or more sensitive passwords. For example, in a sensitive dataset accessed using the sensitive passwords, the release of energy usage data from the sensitive dataset may be based on the number of households present in a sensitive dataset. A non-refutable protocol risk decomposition consists of a protocol risk decomposition generated using a non-refutable execution graph registry.

Figure 10:
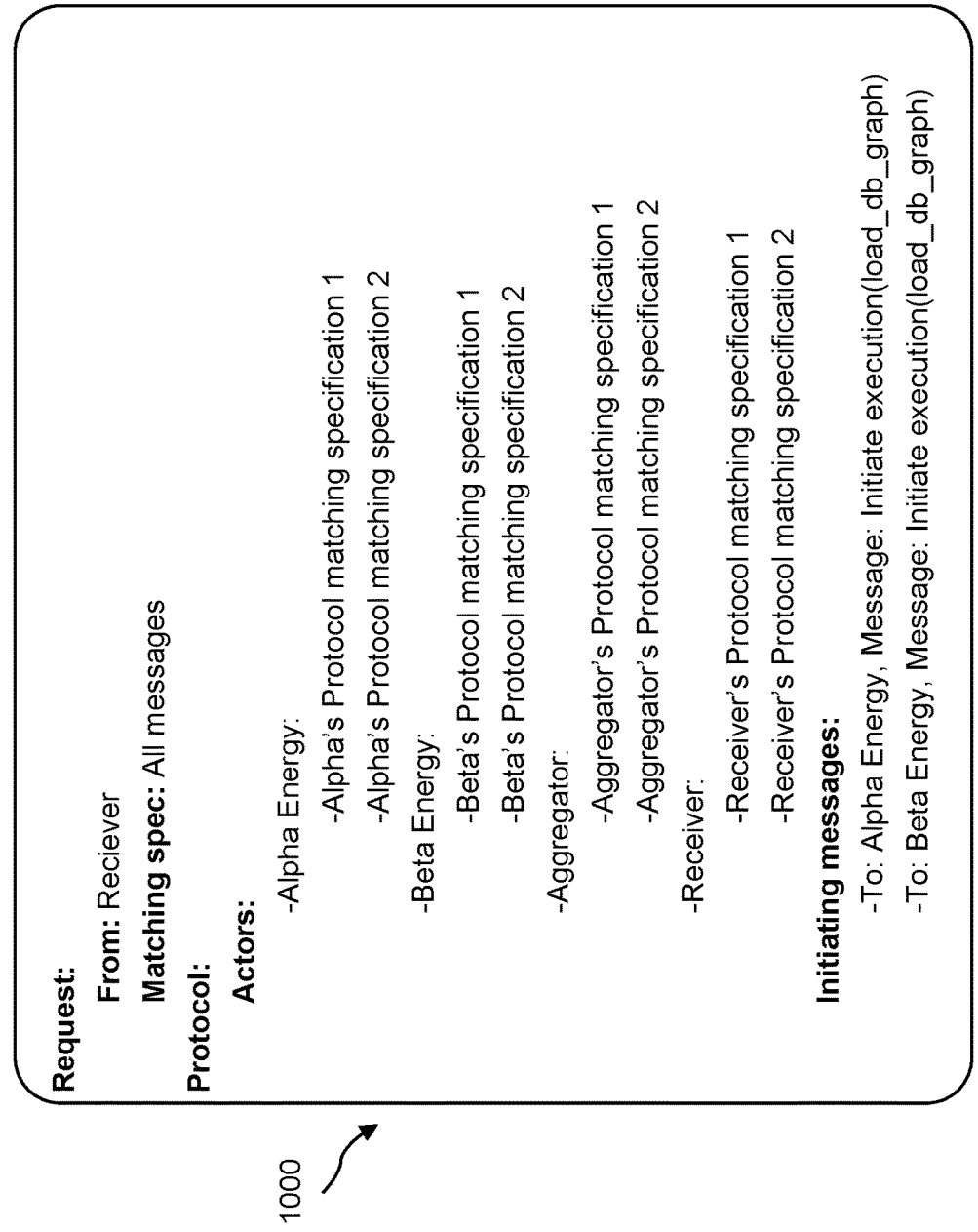
FIG. 10 illustrates an example of protocol request, in accordance with some embodiments.

FIG. 10 illustrates an example of protocol request 1000, in accordance with some embodiments. A protocol request may include a protocol, as well as directions for a request to extract one or more messages received by one or more protocol actors of the protocol. An entity, or protocol requestor, that may request a protocol via a protocol request, such as the example protocol request 1000. In response to the protocol request, the protocol requestor may receive a specific protocol message containing the answer to a particular data analysis task of the protocol. For example, an AP 124 may be a protocol requestor and may request a protocol to retrieve data from protocol actors, such as example energy companies Alpha Energy and Beta Energy. The AP 124 may then use the data as training data for a machine learning model.

A protocol request risk assessment may correspond to the execution metadata associated with a particular protocol message received by a protocol actor in the network environment. An optimistic protocol request risk assessment may assume that a protocol actor is following the protocol and that the execution metadata associated with the requested protocol message is transmitted to the protocol requestor. A pessimistic protocol request risk assessment may assume that the protocol actor is not following the protocol and may not send at least one of the protocol messages it has received to the protocol requestor. A collusion-based request risk assessment may assume that one or more protocol actors may be sharing their protocol messages and that the protocol requestor may receive at least the union of the protocol messages that the colluding parties have received. A protocol risk assessment may include a mapping of a data file, or set-of-bytes, to the protocol risk decomposition used to create that specific data file. A protocol request risk assessment for a respective protocol may be based on a comparison with the protocol request risk assessments for other protocols.

Figure 11:
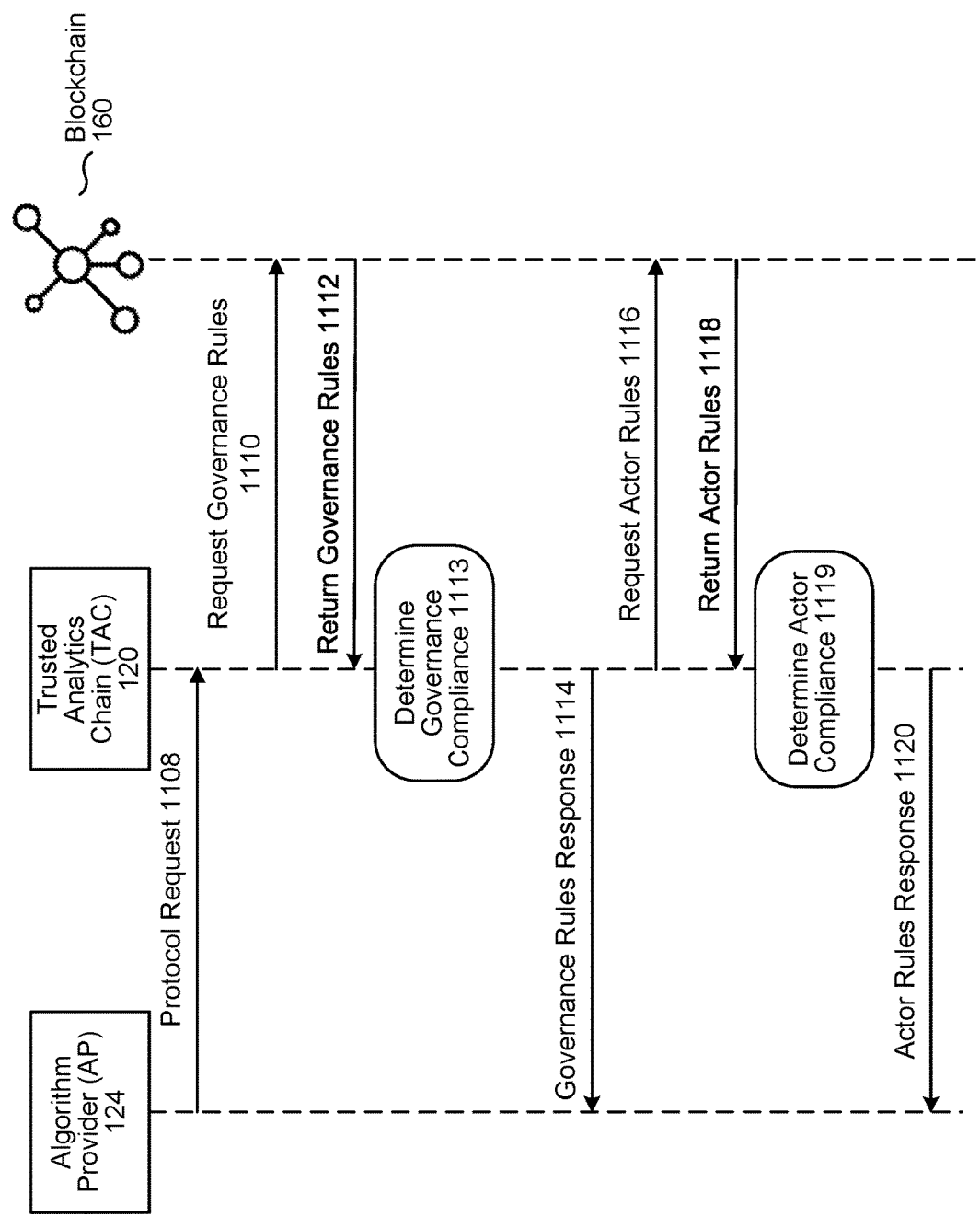
FIG. 11 illustrates an example routine for a protocol requestor interfacing with a protocol regulatory framework, in accordance with some embodiments.

FIG. 11 illustrates an example routine 1100 for a protocol requestor interfacing with a protocol regulatory framework, in accordance with some embodiments. A protocol regulatory framework may be specified network-wide by a protocol governance mechanism. A protocol regulatory framework may be specified individually by each protocol actor. A protocol regulatory framework may indicate rules or preferences for a protocol to be executed. The protocol regulatory framework may include governance rules and actor rules and may specify a minimum number of data points required before the results of a protocol execution may be released to the protocol requestor.

As shown in FIG. 11, the AP component 124, or protocol requestor, may make a protocol request (1108), as described in reference to FIG. 10, to the TAC 120. In response to receiving the protocol request, the TAC 120 may request the governance rules (1110) (explained below) from the blockchain 160 associated with the protocol of the protocol request (1108). The blockchain 160 may return the governance rules for the protocol (1112). The TAC component 120 may determine with the protocol governance mechanism and the governance rules whether the requested protocol is allowed by the governance mechanisms (1113). The TAC 120 may respond to the AP 124 with the results of the governance rules determination (1114). The results may indicate if the AP 124 may proceed with the protocol request or if the AP 124 is prevented from requesting the protocol, and thus receiving the results of the protocol.

Each protocol actor may specify a respective protocol regulatory framework for the execution of protocols that include the respective protocol actor. In response to the TAC 120 determining that the AP 124 component may proceed with the protocol request based on the governance rules, the TAC 120 may request the actor rules (1115) from the blockchain 160. The actor rules may be a set of rules associated with a protocol actor that may be a part of the requested protocol. The blockchain 160 may return the actor rules for the protocol (1118). The TAC 120 may determine with the protocol regulatory framework and the actor rules whether the requested protocol is allowed by the actors (1119). The TAC 120 may respond to the AP 124 with the results of the actor rules determination (1120). The results may indicate if the AP 124 may proceed with the protocol request or if the AP 124 is prevented from requesting the protocol, and thus receiving the results of the protocol. For Example, an actor rule, such as from a DO (e.g., Alpha Energy), may specify that the DO will execute the instructions of the execution graph if the execution graph does not expose any PII data, otherwise the DO may reject the protocol request.

Governance rules may be rules that are applicable based on the type of data or content of the data, and applied to The governance rules may include jurisdictional rules. Jurisdictional rules may be applicable based on the location of the data sources and the types of data collected from the data sources. Jurisdictional rules may indicate what data may be released. For example, data that is collected over time may only be released in blocks of time, such as 30 or 60 minute blocks. Other requirements may be based on the number of individual data producers, such as a smart-meter, that the data is collected from, such as an example jurisdictional rule of not releasing data until at least fifteen data producers are collected such that the data is sufficiently anonymized. For example, a "smart-meter" data-provider system may provide data (i.e., smart-meter data) available for analysis by a second system, such as an AP, but only when certain privacy condition(s) (e.g., k-anonymity) are met. The data may be averaged before release. In some embodiments, an aggregator may collect data from multiple data silos in order to collect data from enough data producers to meet the jurisdictional rule. For example, the TAC 120 may instruct the aggregator, based on the example jurisdictional rule and the instructions of a given protocol to receive execution graph results for a data silo of five data producers and separate execution graph results for a data silo of ten data producers, then combine the results of the two execution graphs to meet the example jurisdictional rule of at least fifteen data producers. The privacy risk may be equivalent to fifteen datapoints in the average.

In some embodiments, the TAC 120 may communicate with the protocol actors, such as the data owners, and may manage the data privacy risk for the protocol actors using the system. For example, a smart-meter data-provider system may make portion of its data available (i.e., residential data or commercial data). The data-provider system may receive generation of proof that only residential data is released and not commercial data via the compliance of the TAC 120 with the governance or actor rules.

The TAC 120 may identify sources (DOs) that may meet the requirements of the jurisdictional rules. Additionally, the TAC 120 may provide instruction to the aggregator to aggregate the results provided from the DOs, but only release the aggregated data when the imposed rules are satisfied. This conditional gatekeeping of the TAC 120 may ensure that data is released when compliant with the rules. By joining data from multiple DOs, This may provide the AP 124 with data that would otherwise be unattainable by interfacing with singular sources and ensures the security and anonymity needed to meet the rules. Thus, a data privacy officer may know the result is legally compliant as the aggregator ensures only the correct number are released.

The actor rules, as described above mainly focus on restrictions for accessing and receiving data from different sources or execution graph results. However, actor rules may not be limited to restrictions, but instead may provide options for collaboration. The actor rules may specify a certain group of protocol actors be a part of the protocol and thus the collaboration, or aggregation, of resultant data is limited to when the identified protocol actors have contributed.

The protocol regulatory framework associated with each protocol actor may approve the protocol before the protocol is executed. A non-refutable protocol regulatory framework is a protocol regulatory framework that is specified using a distributed consensus protocol. A non-refutable protocol governance mechanism is a protocol governance mechanism that is specified using a distributed consensus protocol.

Figure 12A:
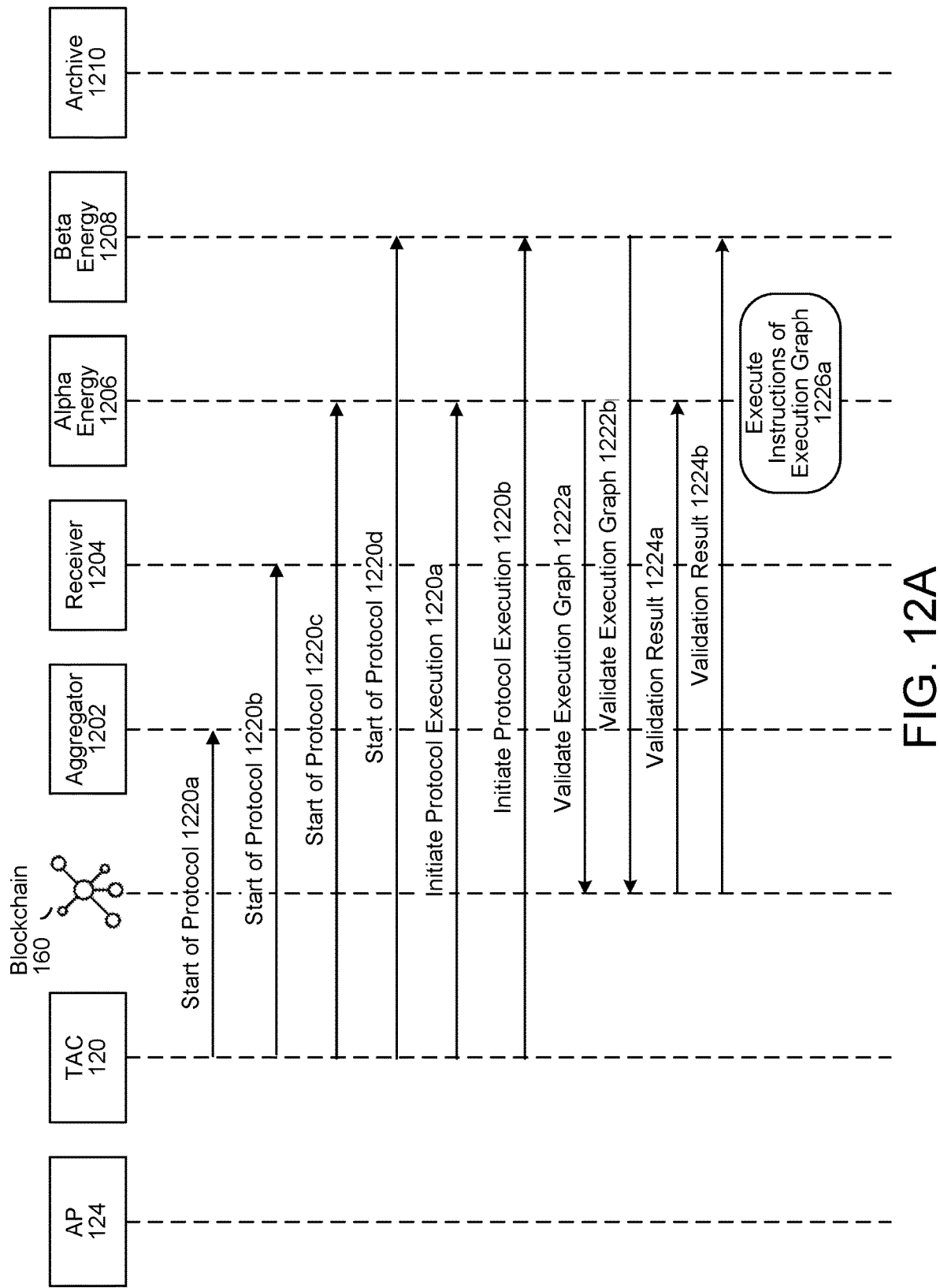
FIGS. 12A and 12B illustrate an example process of executing a protocol, in accordance with some embodiments.
Figure 12B:
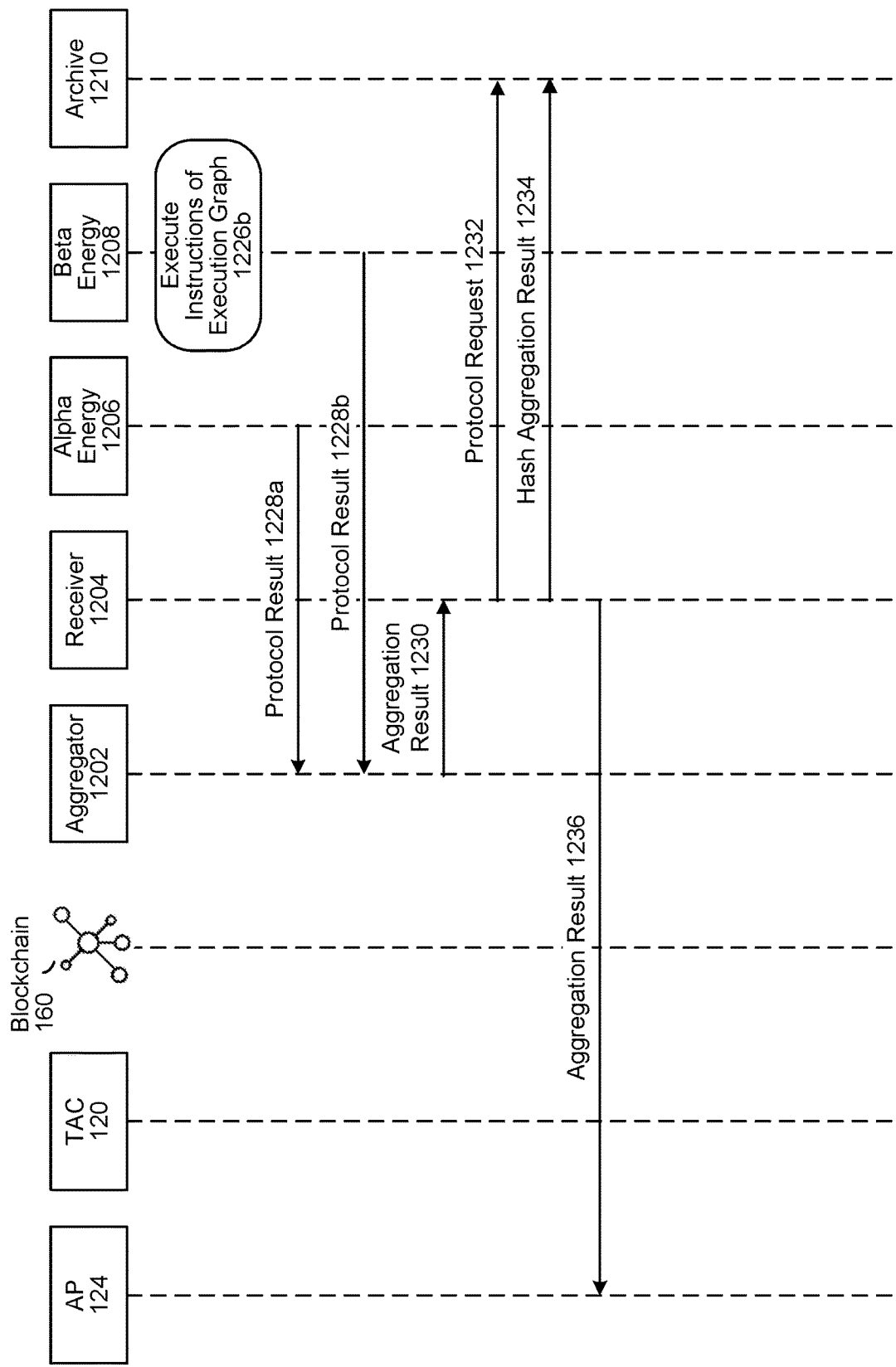

FIGS. 12A and 12B illustrates an example process of executing a protocol, in accordance with some embodiments. The processes illustrated in FIGS. 12A and 12B are preceded by the processes described above with reference to FIG. 11. After confirming governance rule(s) and/or actor rule(s) compliance, as shown in FIG. 11, the TAC 120 component may begin the protocol execution. The TAC 120 component may send a protocol message to start the protocol (1120a, 1120b, 1120c, and 1120d) to the protocol actors identified in the protocol. For example, the protocol 900 includes four protocol actors: Aggregator component 1202, Receiver component 1204, Alpha Energy component 1206, and Beta Energy component 1208. Although four such protocol actors are shown in FIGS. 12A and 12B, it should be appreciated that additional or fewer protocol actors may be a part of the protocol execution in some circumstances. Additionally, although two such DOs are shown in FIGS. 12A and 12B, it should be appreciated that additional or fewer DOs may be employed in some circumstances. The AP component 124, TAC component 120, Aggregator component 1202, Receiver 1204 component, Alpha Energy component 1206, and Beta Energy component 1208, may be separate and distinct computing systems or may be separate processes or virtual machines on the same physical computing system.

The protocol message to start the protocol (1120a, 1120b, 1120c, and 1120d) may indicate to the protocol actors to begin awaiting protocol messages related to the protocol identified in the protocol message to start the protocol (1120a, 1120b, 1120c, and 1120d). Additionally, protocol message to start the protocol (1120a, 1120b, 1120c, and 1120d) from the TAC 120 may indicate that the TAC 120 has confirmed compliance for the protocol with any applicable governance rules or actor rules retrieved from the blockchain. Based on the compliance performance of the TAC 120, as described above in reference to FIG. 11, the protocol actors may execute their respective roles of the protocol.

After sending protocol messages to the protocol actors that the protocol is beginning, the TAC 120 may transmit a protocol message to the protocol actors that perform the first step of the protocol. In the example routine 1100 illustrated in FIG. 11, (and detailed in the protocol in FIG. 9), the DOs, Alpha Energy 1206 and Beta Energy 1208, receive a protocol message from the TAC 120 to initiate the protocol execution (1220*a* and 1220*b*). As disclosed above in relation to FIG. 7, a protocol message, such as protocol message 705 of the type to initiate execution, may include fields that identify how the protocol actor is to perform upon receiving the protocol message. As found in the example protocol message 705, the field may identify an execution graph specification for the protocol actor to execute. The protocol actor may, upon receipt of a protocol message, match the received protocol message with a protocol matching specification as described above in reference to FIG. 8, to validate the message before executing the instructions of the received protocol message.

In response to receiving the protocol message to initiate the protocol execution (1220*a* and 1220*b*), including initiation for the execution graph, the protocol actor may validate the execution graph using the execution graph registries stored on the blockchain 160 (1222*a* and 1222*b*). As disclosed above, an execution graph registry may be a non-refutable execution graph registry when stored at a distributed consensus mechanism, such as a blockchain. The non-refutable aspect of the execution graph registry provides assurance to the protocol actors that the execution graph has been accepted and verified with the other protocol actors. In response to the validation request, the protocol actors, such as the DOs, may receive a validation result (1224*a* and 1224*b*) from the blockchain.

Utilizing the secure and encrypted nature of the TAC 120 and stability/immutability of the blockchain, it is possible to provide confirmation that certain steps, such as the execution of PII scrubbing, were performed and the data remains secure and no exposure of sensitive data.

The protocol actors that received protocol messages to initiate the protocol execution, such as Alpha Energy and Beta Energy, may, upon receiving validation of the execution graph registry, execute instructions of the execution graph (1226*a* and 1226*b*). As shown in the example execution graph 300 of FIG. 3, this may include a process of acquiring secret data, such as a password, to access a dataset and then scrubbing the data set of identifiable information, such as PII. The execution of instructions corresponding to the execution graph may provide a dataset as a result. One or more of the protocol actors may be delimited in scope to the protocol. For example, such a protocol actor may stop the current computing processes when the protocol is executed. When a protocol actor's respective computing processes are stopped, the protocol risk decomposition corresponding to the protocol actor may be deleted.

Upon completion of the execution graph, the results of the execution graph, such as a dataset, may be sent to the aggregator 1202 (1228*a* and 1228*b*). The aggregator may receive the execution graph results, such as a dataset, from one or more of the protocol actors. The respective results are combined to further anonymize the data and as may be required by a set of actor rules. For example, a protocol actor may provide their dataset dependent on a threshold of other datasets contributed. The aggregator 1202 may track the number of datasets received and begin including a protocol actor's gated dataset once the threshold of datasets is met for the respective protocol actor.

In some embodiments, the TAC 120 may provide taint analysis. Information such as a sender and a receiver of transmitted data may not sufficiently prove that the result of a given computation, such as the result of an execution graph, has a given privacy property (i.e., meets a specific standard of balkanization). Taint analysis may provide information to trace the flow of information between different functions/steps of a computation, such as the execution graph nodes of an execution graph.

In some embodiments, the TAC 120 may provide data provenance, in other words, a history or tracing of the data. This may be similar to a taint for data privacy risk but may instead, or in addition, may include metadata about what transformations have been performed on the data. For example, a regulator system processing failure statistics may validate the provenance, or data history, of all failure reports, and the chain of custody of sensor and/or other data, as the data moves through the protocol, into a report. The smart-meter system may receive proof that the failure report was created. In some embodiments, the TAC 120 may track data taint (and provenance) across different steps of the protocol. As the dataset is transmitted from a DO, the dataset may have one type of taint (i.e., database access taint). After the dataset is aggregated and a privacy screen is applied, the data may acquire a new taint/sanitization. A privacy screen may be a threshold of data inputs that ensures a level of data dilution that may prevent source identification. An example of a privacy screen may be, as described above, requiring a certain number of data producers before the aggregated dataset is released. The AP 124 or protocol actor may identify that the end result is protected by homomorphic encryption (HE) and/or the privacy screen.

The aggregator 1202 may transmit the aggregation result to the receiver 1204 (1230). In response, the receiver 1204 may send the protocol request (1232) and a hash of the aggregation result (1234) to the archive 1210 so that the protocol request and result may be stored together. The hash may be used to identify the protocol and the data that was provided to the AP. Thus, by providing a hash to match with the hash stored in the archive, it may be possible to identify a protocol instance and use that protocol instance trace the operations performed and identify any privacy risk (as explained below). Finally, the receiver 1204 may sent the aggregation result to the AP, or protocol requestor.

Figure 13:
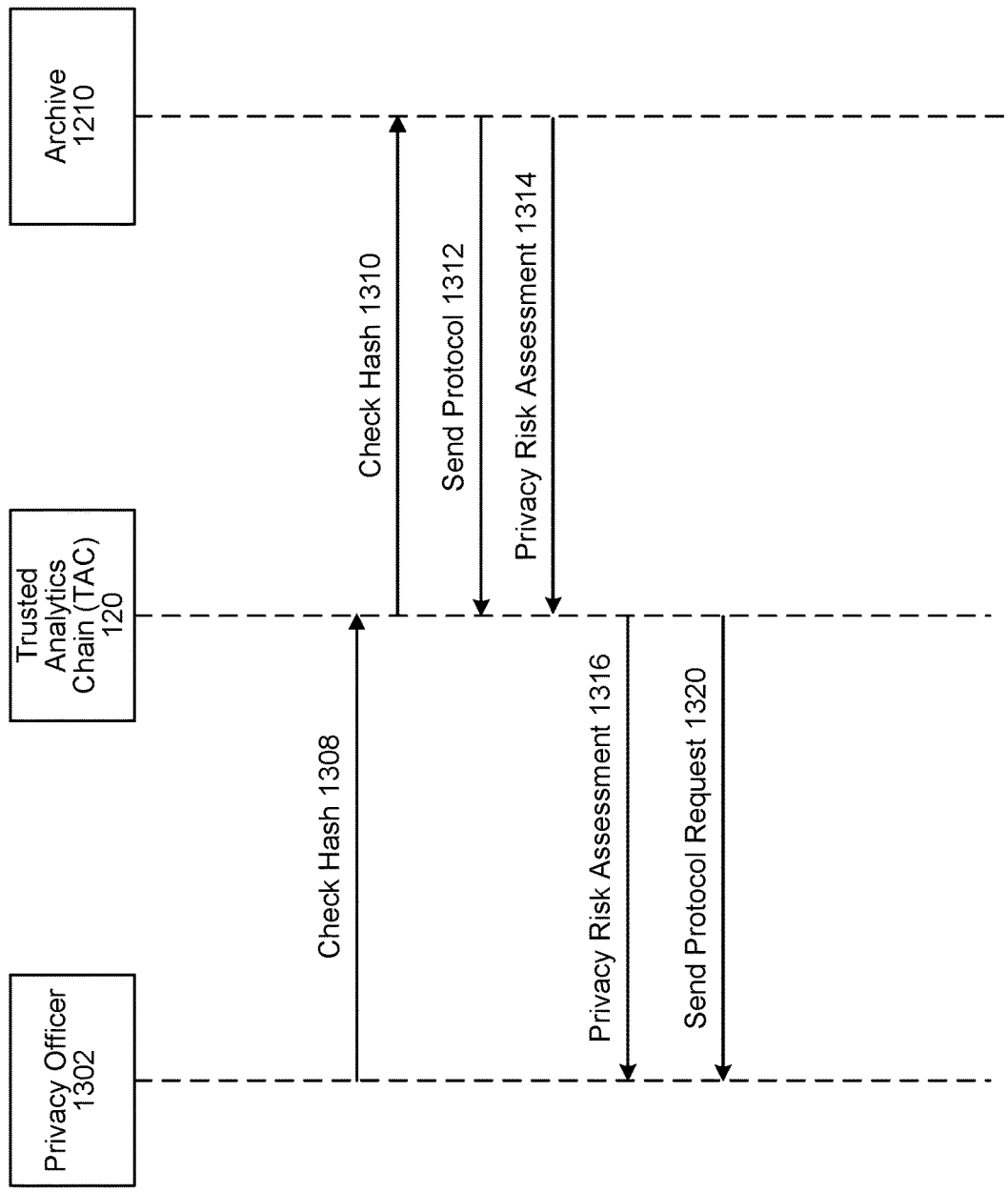
FIG. 13 illustrates an example of a process to identify a protocol based on a hash, in accordance with some embodiments.

FIG. 13 illustrates an example of a process 1300 to identify a protocol based on a hash, in accordance with some embodiments. A protocol archival mechanism, such as the archive 1210, may receive the output, such as the aggregation result, of a specific execution graph associated with a specific protocol actor. The protocol archival mechanism may map the protocol and the protocol output to persistent storage and may associate the protocol risk decomposition specific to the output with a hash of the output. A non-refutable protocol archival mechanism is a protocol archival mechanism that uses a distributed consensus mechanism for its archive as well as its execution graph registry.

An entity, such as a privacy officer 1302, which monitors risk and data exposure for a data owner (i.e., an energy provider) or the data producers (i.e., smart-meters) of a data owner may investigate a protocol that was performed. The privacy officer 1302 may send a request to the TAC 120 to check a provided hash (1308) that may identify a protocol. The TAC 120 may send a request to the protocol archival mechanism to check the provided hash (1310) against the protocols and associated hashes stored at the protocol archival mechanism. A protocol risk assessment may be determined by matching the hash of the data file to a record in the persistent storage of the protocol archival mechanism. A non-refutable protocol risk assessment may be determined similarly using a non-refutable protocol archival mechanism.

At the protocol archival mechanism, the provided has may be used to identify a protocol instance, the associated output of the protocol instance, and the protocol risk assessment for the protocol instance. The protocol risk assessment may be based relatively to other protocols. The protocol risk assessment may be relatively adjusted based on the execution graph nodes of an execution graph for the protocol. For example, an execution graph node which requests a password from a DO, such as execution graph node 200, may increase the protocol risk assessments, but conversely, an execution graph node which removes PII, such as execution graph node 315, may decrease the protocol risk assessment. The protocol archival mechanism may return to the TAC 120 the protocol instance (1312) and the protocol risk assessment (1314). Similarly, the TAC 120 may then send the protocol instance (1320) and the protocol risk assessment (1316) to the requesting privacy officer 1302. The privacy officer 1302 may desire to confirm the execution of the protocol instance conformed to the determined rules and constraints. Using the hash, the privacy officer 1302 is able to audit the protocol instances by retrieving the protocol instance and output.

Figure 14:
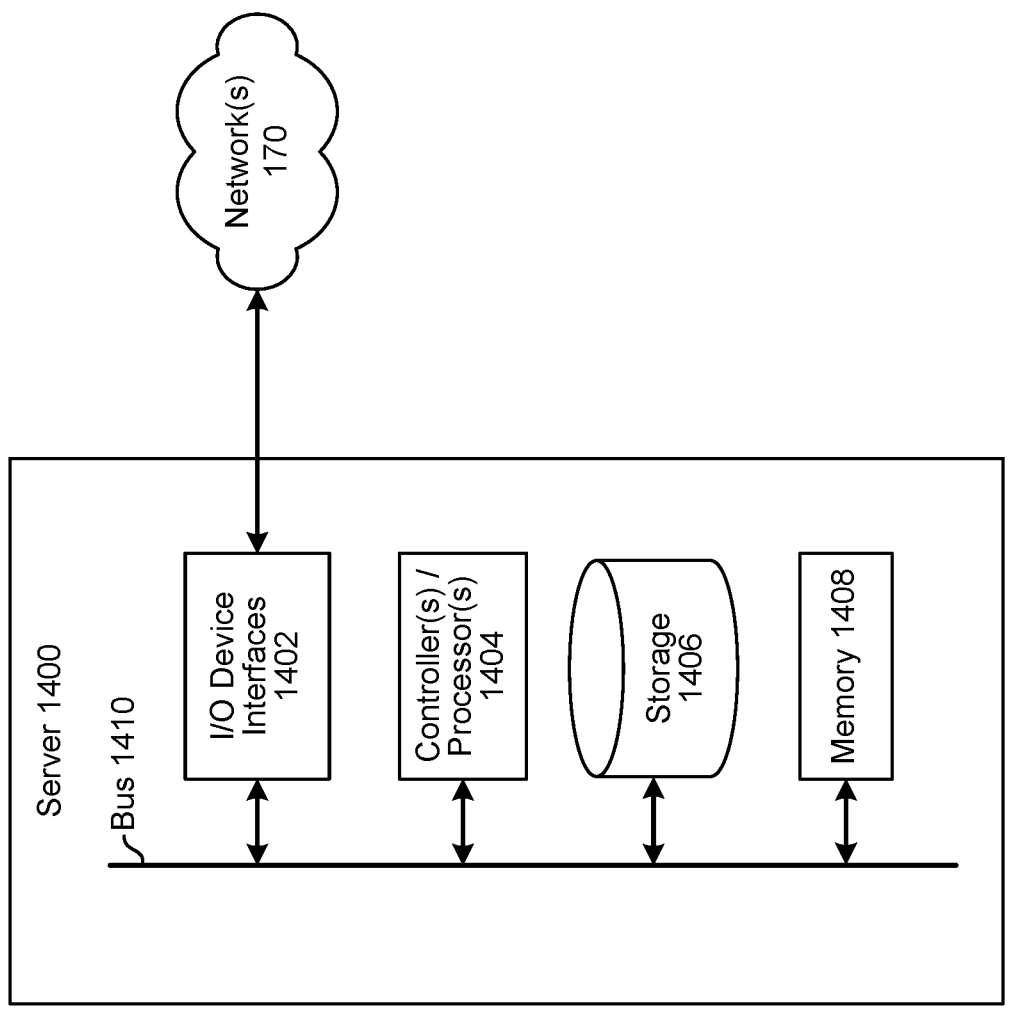
FIG. 14 illustrates components of a system according to embodiments of the present disclosure.

FIG. 14 is a block diagram illustrating a computing environment that includes a server 1400; the server 1400 may be the TAC 120, the AP 124, the data owner system 125, the blockchain 160, the aggregator 1202, the receiver 1204, and/or the archive 1210. The server 1400 may include one or more physical devices and/or one or more virtual devices, such as virtual systems that run in a cloud server or similar environment. The server 1400 may include one or more input/output device interfaces 1402 and controllers/processors 1404. The server 1400 may further include storage 1406 and a memory 1408. A bus 1410 may allow the input/output device interfaces 802, controllers/processors 1404, storage 1406, and memory 1408 to communicate with each other; the components may instead or in addition be directly connected to each other or be connected via a different bus.

A variety of components may be connected through the input/output device interfaces 1402. For example, the input/output device interfaces 1402 may be used to connect to the network 170. Further components include keyboards, mice, displays, touchscreens, microphones, speakers, and any other type of user input/output device. The components may further include USB drives, removable hard drives, or any other type of removable storage.

The controllers/processors 1404 may processes data and computer-readable instructions and may include a general-purpose central-processing unit, a specific-purpose processor such as a graphics processor, a digital-signal processor, an application-specific integrated circuit, a microcontroller, or any other type of controller or processor. The memory 1408 may include volatile random access memory (RAM), non-volatile read only memory (ROM), non-volatile magnetoresistive (MRAM), and/or other types of memory. The storage 1406 may be used for storing data and controller/processor-executable instructions on one or more non-volatile storage types, such as magnetic storage, optical storage, solid-state storage, etc.

Computer instructions for operating the server 1400 and its various components may be executed by the controller(s)/processor(s) 1404 using the memory 1408 as temporary "working" storage at runtime. The computer instructions may be stored in a non-transitory manner in the memory 1408, storage 1406, and/or an external device(s). Alternatively, some or all of the executable instructions may be embedded in hardware or firmware on the respective device in addition to or instead of software.

Figure 15:
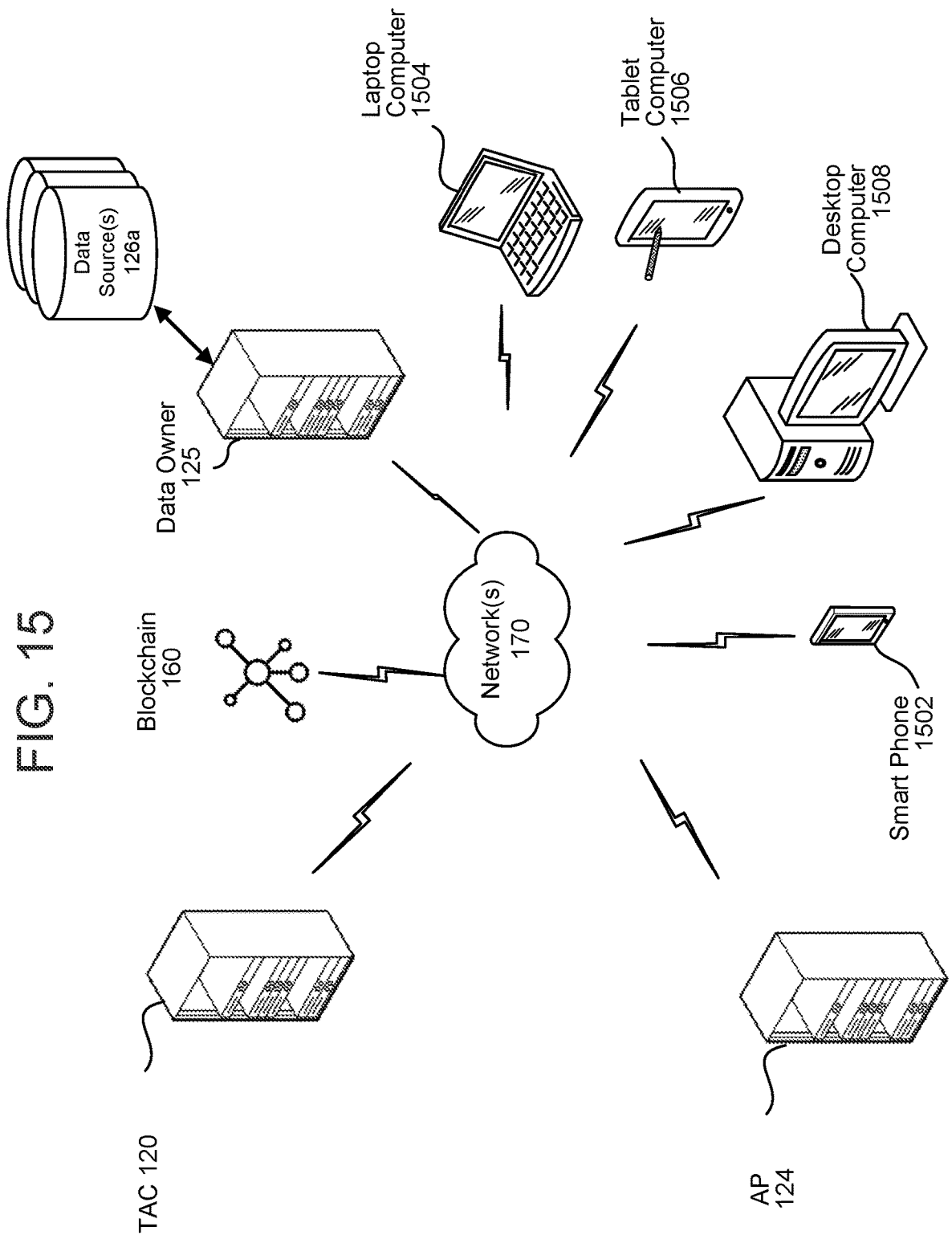
FIG. 15 illustrates a network according to embodiments of the present disclosure.

FIG. 15 illustrates a number of devices in communication with the TAC 120, the AP 124, and/or the data owner system 125 using the network 170. The devices may include a smart phone 1502, a laptop computer 1504, a tablet computer 1506, and/or a desktop computer 1508. These devices may be used to remotely access the data owner system 125, the AP 124, and/or, through such components, the TAC 120, to perform any of the operations described herein.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and data processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A first system comprising:
at least one processor; and
at least one memory including instructions that, when executed by the at least one processor, cause the first system to:
receive, from a second system, a first request to execute a protocol, wherein the protocol includes a second request corresponding to a first data source and a function;
determine a third system associated with the first data source;
send, to the third system, the second request to execute the function;
causing the third system to send, to at least one device associated with a blockchain, a third request to obtain first data corresponding to executable computer instructions of the function, the first data corresponding to an agreement between at least a first party corresponding to the second system and a second party corresponding to the third system regarding the function;
cause the third system to execute the executable computer instructions of the function to determine a first dataset; and
cause the first dataset to be sent to the second system.

2. The first system of claim 1, wherein the at least one memory further includes instructions, that, when executed by the at least one processor, further cause the first system to, in response to receiving the first request:
send, to the at least one device associated with the blockchain, a fourth request to obtain second data corresponding to rules based on the protocol; and
receive the second data.

3. The first system of claim 2, wherein the second data includes at least one rule corresponding to a location.

4. The first system of claim 2, wherein the second data includes at least one rule corresponding to accessing data of the first data source.

5. The first system of claim 1, wherein the protocol includes a fourth request corresponding to a second data source, and the at least one memory further includes instructions, that, when executed by the at least one processor, further cause the first system to:
determine a fourth system associated with the second data source;
send, to the fourth system, the fourth request to execute the function represented in execution graph;
cause the fourth system to send, to the at least one device associated with the blockchain, a fifth request to obtain third data corresponding to the executable computer instructions of the function, the third data corresponding to an agreement between at least the first party, the second party, and a third party corresponding to the fourth system regarding the function;
cause the fourth system to execute the executable computer instructions of the function to determine a second dataset; and
cause the second dataset to be sent to the second system.

6. The first system of claim 5, wherein the at least one memory further includes instructions, that, when executed by the at least one processor, further cause the first system to:
determine a combination of records of the first dataset and the second dataset exceeds a predetermined threshold.

7. The first system of claim 5, wherein the at least one memory further includes instructions, that, when executed by the at least one processor, further cause the first system to:
determine an aggregate of the first dataset and the second dataset; and
send, to the second system, the aggregate.

8. The first system of claim 1, wherein the at least one memory further includes instructions, that, when executed by the at least one processor, further cause the first system to:
generate a hash based on the first dataset; and
store, in a database, the protocol and the hash.

9. The first system of claim 1, wherein the at least one memory further includes instructions, that, when executed by the at least one processor, further cause the first system to:
determine, based on the function, fourth data representing at least one field of the first dataset, wherein the at least one field includes sensitive information;
determine a subset of data from the first dataset based at least in part on the at least one field; and
determine a clean first dataset by removing the subset of data from the first dataset, wherein causing the first dataset to be sent to the second system includes sending the clean first dataset to the second system.

10. The first system of claim 1, wherein the at least one memory further includes instructions, that, when executed by the at least one processor, further cause the first system to:
generate a first record data associating the first dataset and the protocol;
cause the first record data to be stored in a database;
receive a sixth request, wherein the sixth request identifies the first dataset;
determine the first record data based on the first dataset; and
send fifth data representing the protocol.

11. A computer-implemented method comprising:
receiving, by a first system from a second system, a first request to execute a protocol, wherein the protocol includes a second request corresponding to a first data source and a function;
determining a third system associated with the first data source;
sending, from the first system to the third system, the second request to execute the function;
causing the third system to send, to at least one device associated with a blockchain, a third request to obtain first data corresponding to executable computer instructions of the function, the first data corresponding to an agreement between at least a first party corresponding to the second system and a second party corresponding to the third system regarding the function;
causing the third system to execute the executable computer instructions of the function to determine a first dataset; and
causing the first dataset to be sent to the second system.

12. The computer-implemented method of claim 11, further comprising, in response to receiving the first request:
sending, to the at least one device associated with the blockchain, a fourth request to obtain second data corresponding to rules based on the protocol; and
receiving the second data.

13. The computer-implemented method of claim 12, wherein the second data includes at least one rule corresponding to a location.

14. The computer-implemented method of claim 12, wherein the second data includes at least one rule corresponding to accessing data of the first data source.

15. The computer-implemented method of claim 11, wherein the protocol includes a fourth request corresponding to a second data source, the method further comprising:
   determining a fourth system associated with the second data source;
   sending, to the fourth system, the fourth request to execute the function represented in execution graph;
   causing the fourth system to send, to the at least one device associated with the blockchain, a fifth request to obtain third data corresponding to the executable computer instructions of the function, the third data corresponding to an agreement between at least the first party, the second party, and a third party corresponding to the fourth system regarding the function;
   causing the fourth system to execute the executable computer instructions of the function to determine a second dataset; and
   causing the second dataset to be sent to the second system.

16. The computer-implemented method of claim 15, further comprising:
   determining a combination of records of the first dataset and the second dataset exceeds a predetermined threshold.

17. The computer-implemented method of claim 15, further comprising:
   determining an aggregate of the first dataset and the second dataset; and
   sending, to the second system, the aggregate.

18. The computer-implemented method of claim 11, further comprising:
   generating a hash based on the first dataset; and
   storing, in a database, the protocol and the hash.

19. The computer-implemented method of claim 11, further comprising:
   determining, based on the function, fourth data representing at least one field of the first dataset, wherein the at least one field includes sensitive information;
   determining a subset of data from the first dataset based at least in part on the at least one field; and
   determining a clean first dataset by removing the subset of data from the first dataset, wherein causing the first dataset to be sent to the second system includes sending the clean first dataset to the second system.

20. The computer-implemented method of claim 11, further comprising:
   generating a first record data associating the first dataset and the protocol;
   causing the first record data to be stored in a database;
   receiving a sixth request, wherein the sixth request identifies the first dataset;
   determining the first record data based on the first dataset; and
   sending fifth data representing the protocol.

* * * * *